US012272030B2

(12) United States Patent
DeLaRosa et al.

(10) Patent No.: US 12,272,030 B2
(45) Date of Patent: Apr. 8, 2025

(54) BUILDING UNITS FOR MACHINE LEARNING MODELS FOR DENOISING IMAGES AND SYSTEMS AND METHODS FOR USING SAME

(71) Applicant: MICRON TECHNOLOGY, INC., Boise, ID (US)

(72) Inventors: Bambi L DeLaRosa, Boise, ID (US); Katya Giannios, Boise, ID (US); Abhishek Chaurasia, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 785 days.

(21) Appl. No.: 17/445,382

(22) Filed: Aug. 18, 2021

(65) Prior Publication Data

US 2022/0309618 A1  Sep. 29, 2022

Related U.S. Application Data

(60) Provisional application No. 63/163,678, filed on Mar. 19, 2021, provisional application No. 63/163,688, (Continued)

(51) Int. Cl.
*G06T 5/70* (2024.01)
*G06N 3/048* (2023.01)
(Continued)

(52) U.S. Cl.
CPC .............. *G06T 5/70* (2024.01); *G06N 3/048* (2023.01); *G06N 3/08* (2013.01); *G06T 5/50* (2013.01);
(Continued)

(58) Field of Classification Search
CPC ........... G06T 5/70; G06T 5/50; G06T 7/0012; G06T 2207/10061; G06T 2207/20081;
(Continued)

(56) References Cited

U.S. PATENT DOCUMENTS 5,383,457 A * 1/1995 Cohen ................. G01S 7/52028
73/635
9,792,900 B1 10/2017 Kaskari et al.
(Continued)

FOREIGN PATENT DOCUMENTS

CN  102175625 A  9/2011
CN  107492090 A  12/2017
(Continued)

OTHER PUBLICATIONS

Muhammad Sufian et al. "Denoising the Wireless Channel Corrupted Images Using Maching Learning" 2019 20th IEEE/ACIS International Conference on Software Engineering, Artificial Intelligence, Networking and Parallel/Distributed Computing; Jul. 2019; pp. all.

(Continued)

Primary Examiner — Mia M Thomas
(74) Attorney, Agent, or Firm — Dorsey & Whitney LLP

(57) ABSTRACT

In some examples, a machine learning model may be trained to denoise an image. In some examples, the machine learning model may identify noise in an image of a sequence based at least in part, on at least one other image of the sequence. In some examples, the machine learning model may include a recurrent neural network. In some examples, the machine learning model may have a modular architecture including one or more building units. In some examples, the machine learning model may have a multi-branch architecture. In some examples, the noise may be identified and removed from the image by an iterative process.

37 Claims, 21 Drawing Sheets

Related U.S. Application Data filed on Mar. 19, 2021, provisional application No. 63/163,682, filed on Mar. 19, 2021.

(51) Int. Cl.
*G06N 3/08* (2023.01)
*G06T 5/50* (2006.01)
*G06T 7/00* (2017.01)

(52) U.S. Cl.
CPC .. *G06T 7/0012* (2013.01); *G06T 2207/10061* (2013.01); *G06T 2207/20081* (2013.01); *G06T 2207/20084* (2013.01); *G06T 2207/20216* (2013.01)

(58) Field of Classification Search
CPC . G06T 2207/20084; G06T 2207/20216; G06T 5/60; G06T 2207/30148; G06N 3/048; G06N 3/08; G06N 3/0442; G06N 3/0464; G06N 3/084; G06N 3/09
See application file for complete search history.

(56) References Cited

U.S. PATENT DOCUMENTS

| | | | |
|---|---|---|---|
| 10,063,255 B2 * | 8/2018 | Riedel | H04B 1/16 |
| 10,726,525 B2 | 7/2020 | El-Khamy et al. | |
| 11,330,378 B1 * | 5/2022 | Jelčicová et al. | H04R 25/507 |
| 11,657,504 B1 * | 5/2023 | Moinuddin | G06T 5/60 |
| | | | 382/128 |
| 11,790,492 B1 | 10/2023 | Ahmad et al. | |
| 12,086,703 B2 | 9/2024 | Delarosa et al. | |
| 2004/0071367 A1 | 4/2004 | Irani et al. | |
| 2006/0285020 A1 | 12/2006 | Shin et al. | |
| 2013/0266057 A1 | 10/2013 | Kokaram et al. | |
| 2013/0282297 A1 | 10/2013 | Black et al. | |
| 2017/0140897 A1 | 5/2017 | Phaneuf et al. | |
| 2017/0237484 A1 * | 8/2017 | Heath | H04B 10/07953 |
| | | | 398/26 |
| 2017/0301342 A1 | 10/2017 | Kaskari et al. | |
| 2017/0301344 A1 * | 10/2017 | Kaskari | G10L 15/197 |
| 2017/0359467 A1 * | 12/2017 | Norris | G10L 21/028 |
| 2018/0012460 A1 * | 1/2018 | Heitz, III | G08B 13/19682 |
| 2018/0293713 A1 | 10/2018 | Vogels et al. | |
| 2019/0086496 A1 | 3/2019 | Moeller et al. | |
| 2019/0087646 A1 * | 3/2019 | Goulden | G06T 7/70 |
| 2019/0138887 A1 | 5/2019 | Salem | |
| 2019/0228285 A1 * | 7/2019 | Zhang | G06N 3/04 |
| 2019/0304067 A1 | 10/2019 | Vogels et al. | |
| 2019/0304069 A1 | 10/2019 | Vogels et al. | |
| 2019/0333199 A1 | 10/2019 | Ozcan et al. | |
| 2019/0365341 A1 | 12/2019 | Chan et al. | |
| 2020/0005468 A1 * | 1/2020 | Paul | G06V 10/25 |
| 2020/0021808 A1 | 1/2020 | Mora | |
| 2020/0065633 A1 | 2/2020 | Tiecke et al. | |
| 2020/0267339 A1 | 8/2020 | Douady-Pleven et al. | |
| 2020/0342748 A1 * | 10/2020 | Tournier | G08B 13/19 |
| 2020/0349675 A1 | 11/2020 | Park et al. | |
| 2020/0357099 A1 | 11/2020 | Long et al. | |
| 2020/0388011 A1 | 12/2020 | Nair et al. | |
| 2021/0012463 A1 | 1/2021 | Ramani et al. | |
| 2021/0035268 A1 | 2/2021 | Xu et al. | |
| 2021/0042996 A1 | 2/2021 | Das et al. | |
| 2021/0052226 A1 | 2/2021 | Jauss et al. | |
| 2021/0150674 A1 | 5/2021 | Cai et al. | |
| 2021/0158048 A1 * | 5/2021 | Lee | G06F 18/22 |
| 2021/0290191 A1 | 9/2021 | Qi et al. | |
| 2021/0304364 A1 | 9/2021 | Kabaria et al. | |
| 2022/0044362 A1 | 2/2022 | Sharoukhov et al. | |
| 2022/0107378 A1 | 4/2022 | Dey et al. | |
| 2022/0180572 A1 * | 6/2022 | Maheshwari | G06F 40/30 |
| 2022/0188608 A1 * | 6/2022 | Heinrich | G06N 3/063 |
| 2022/0189100 A1 | 6/2022 | Kosomaa et al. | |
| 2022/0300789 A1 * | 9/2022 | DeLaRosa | G06N 3/06 |
| 2022/0300791 A1 * | 9/2022 | DeLaRosa | G06N 3/06 |
| 2022/0301112 A1 * | 9/2022 | DeLaRosa | G06T 5/70 |
| 2022/0301113 A1 | 9/2022 | Delarosa et al. | |
| 2022/0301114 A1 | 9/2022 | Marras et al. | |
| 2023/0005106 A1 * | 1/2023 | Buurma | G06T 5/60 |
| 2023/0033442 A1 * | 2/2023 | Xiang | G06N 3/044 |
| 2023/0034382 A1 * | 2/2023 | Kurata | G06V 10/54 |
| 2023/0196515 A1 | 6/2023 | Koch et al. | |
| 2023/0385647 A1 * | 11/2023 | Liu | G06N 3/084 |
| 2024/0020796 A1 | 1/2024 | Marras et al. | |
| 2024/0054615 A1 * | 2/2024 | Young | G06T 3/18 |

FOREIGN PATENT DOCUMENTS

| | | |
|---|---|---|
| CN | 109978778 A | 7/2019 |
| CN | 111598787 A | 8/2020 |
| CN | 111860406 A | 10/2020 |
| WO | 2020016337 A1 | 1/2020 |
| WO | 2022197476 A1 | 9/2022 |
| WO | 2022197477 A1 | 9/2022 |
| WO | 2022197478 A1 | 9/2022 |

OTHER PUBLICATIONS

Shiwei Zhou et al. "Multi-View Image Denoising Using Convolutional Neural Network" Sensors; Jun. 2019; pp. all.
Unpublished PCT Application No. PCT/US2022/019124 filed Mar. 7, 2022; pp. all.
Unpublished PCT Application No. PCT/US2022/019130 filed Mar. 7, 2022; pp. all.
Unpublished PCT Application No. PCT/US2022/019136 filed Mar. 7, 2022; pp. all.
Hosseinkhani, Zohreh , et al., "Adaptive Real-Time Removal of Impulse Noise in Medical Images", Retrieved from https://arxiv.org/abs/1709.02270, Oct. 2017, 9 pages.
Maji, Suman Kumar, et al., "A Feature Based Reconstruction Model for Fluorescence Microscopy Image Denoising", Scientific Reports, vol. 9, Art. No. 7725, May 2019, 9 pages.
Roels, Joris , et al., "An Interactive IMAGEj Plugin for Semi-Automated Image Denoising in Electron Microscopy", Nature Communications, vol. 11, Art. No. 771, Feb. 7, 2020, 13 pages.
George Cazenavette et al. "Architectural Adversarial Robustness: The Case for Deep Pursuit"; Nov. 2020; Cornell University Computer Science; pp. all.
Kenzo Isogawa et al. "Deep Shrinkage Convolutional Neural Network for Adaptive Noise Reduction"; IEEE Signal Processing Letters; vol. 25, No. 2; Feb. 2018; pp. all.
Sara Cavallaro et al. "High Throughput Imaging of Nanoscale Extracellular Vesicles by Scanning Electron Microscopy for Accurate Size-Based Profiling and Morphological Analysis"; Cold Spring Harbor Laboratory; Jan. 2021; pp. all.
U.S. Appl. No. 17/445,376 titled "Modular Machine Learning Models for Denoising Images and Systems and Methods for Using Same", filed Aug. 18, 2021.
U.S. Appl. No. 17/445,377 titled "Building Units for Machine Learning Models for Denoising Images and Systemsand Methods for Using Same", filed Aug. 18, 2021.
U.S. Appl. No. 17/445,379 titled "Systems and Methods for Training Machine Learning Models for Denoisingimages", filed Aug. 18, 2021.
U.S. Appl. No. 17/445,380 titled "Modular Machine Learning Models for Denoising Images and Systems Andmethods for Using Same", filed Aug. 18, 2021.
Jain, Viren et al., "Natural Image Denoising with Convolutional Networks", Advances in Neural Information Processing Systems, 2009, 769-776.
Krull, Alexander et al., "Noise2Void—Learning Denoising From Single Noisy Images", MPI-CBG/PKS (CSBD), Dresden, Germany, arXiv e-prints, arXiv:1811.10980, Nov. 2018, 1-9.
Lehtinen, Jaakko et al., "Noise2Noise: Learning Image Restoration Without Clean Data", https://github.com/NVlabs/noise2noise, arXiv e-prints, arXiv:1803.04189, Mar. 2018, 1-12.
Remez, Tal et al., "Class-Aware Fully-Convolutional Gaussian And Poisson Denoising", IEEE Transactions on Image Processing, 27(11), Nov. 2018, 5707-5722.

(56) References Cited

OTHER PUBLICATIONS

Remez, Tal et al., "Deep Class Aware Denoising", School of Electrical Engineering, Tel-Aviv University, Israel, Computer Science Department, Technion—IIT, Israel, arXiv e-prints, arXiv:1701.01698, Jan. 2017, 1-23.

Riesterer, Jessica et al., "A Workflow For Visualizing Human Cancer Biopsies Using Large-Format Electron Microscopy", bioRxiv, 2009.

Ronneberger, Olaf et al., "U-Net: Convolutional Networks For Biomedical Image Segmentation", Computer Science Department and BIOSS Centre for Biological Signalling Studies, University of Freiburg. Germany, arXiv e-prints, http://lmb.informatik.uni-freiburg.de/, May 2015, 1-8.

Shi, Xingjian et al., "Convolutional LSTM Network: A Machine Learning Approach For Precipitation Nowcasting", Department of Computer Science and Engineering Hong Kong University of Science and Technology, rXiv:1506.04214, Jun. 2015, 1-12.

Wu, Dufan et al., "Consensus Neural Network for Medical Imaging Denoising With Only Noisy Training Samples", Center for Advanced Medical Computing and Analysis, Massachusetts General Hospital and Harvard Medical School, Boston, MA 02114, USA Gordon Center for Medical Imaging, Massachusetts General Hospital and Harvard Medical School, Boston, MA 02114, USA, arXiv:1906.03639, Jun. 2019, 1-9.

Yang, Dong et al., "Deep Image-to-Image Recurrent Network With Shape Basis Learning For Automatic Vertebra Labeling In Large-Scale 3D Ct Volumes", Sep. 2017, 498-506.

Cazenavette, George, et al., "Architectural Adversarial Robustness: The Case for Deep Pursuit", https://arxiv.org/abs/2011.14427, Nov. 2020, 11 pages.

Isogawa, Kenzo, et al., "Deep Shrinkage Convolutional Neural Network for Adaptive Noise Reduction", IEEE Signal Processing Letters, vol. 25, No. 2, Feb. 2018, 5 pages.

Sufian, Muhammad, et al., "Denoising The Wireless Channel Corrupted Images Using Machine Learning", 20th IEEE/ACIS International Conference on Software Engineering, Artificial Intelligence, Networking and Parallel/Distributed Computing (SNPD), Jul. 2019, 6 pages.

Cao, Chunshui, et al., "Feedback Convolutional Neural Network for Visual Localization and Segmentation", IEEE Transactions on Pattern Analysis and Machine Intelligence, vol. 41, No. 7, Jul. 2019, 14 pages.

\* cited by examiner

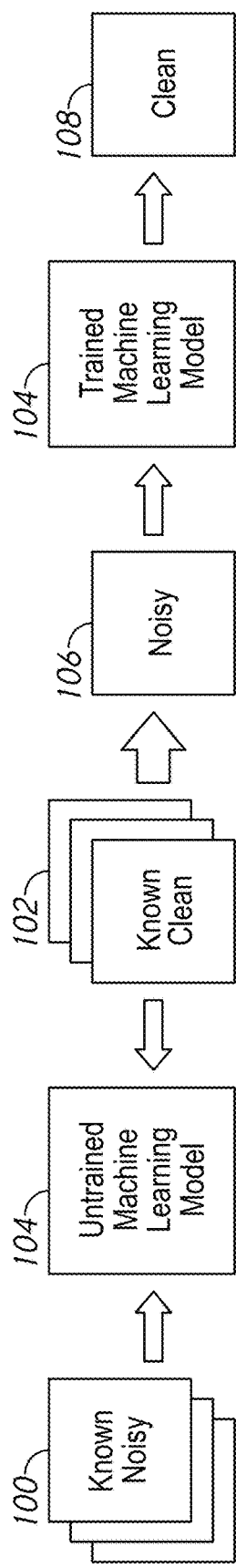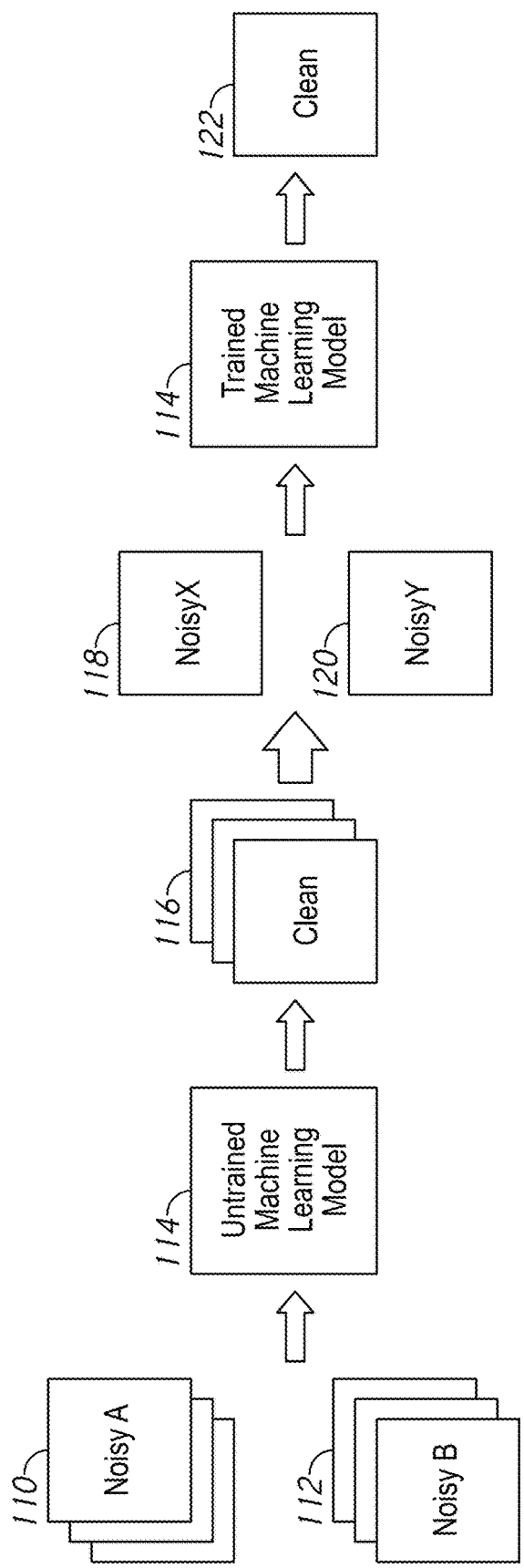
FIG. 1A
FIG. 1B

BUILDING UNITS FOR MACHINE LEARNING MODELS FOR DENOISING IMAGES AND SYSTEMS AND METHODS FOR USING SAME

CROSS REFERENCE TO RELATED APPLICATIONS

This application claims priority to Provisional Application No. 63/163,678, titled "MODULAR MACHINE LEARNING MODELS FOR DENOISING IMAGES AND SYSTEMS AND METHODS FOR USING SAME" filed Mar. 19, 2021, Provisional Application No. 63/163,682, titled "BUILDING UNITS FOR MACHINE LEARNING MODELS FOR DENOISING IMAGES AND SYSTEMS AND METHODS FOR USING SAME", filed Mar. 19, 2021, and Provisional Application No. 63/163,688, titled "SYSTEMS AND METHODS FOR TRAINING MACHINE LEARNING MODELS FOR DENOISING IMAGES", filed Mar. 19, 2021. The aforementioned applications are incorporated herein by reference, in their entirety, for any purpose.

BACKGROUND

Advances in imaging techniques, such as focused ion beam-scanning electron microscopy (FIB-SEM) has enabled unprecedented visualization and analysis of biological cells and interactions between biological cells. For example, using FIB-SEM, images may have resolutions on the order of 4 nm per pixel, allowing visualization of submicron structures, such as organelles within cells. However, as resolution increases so too does noise. Limitations of the imaging modality may make it difficult or impossible to obtain noise-free images at high resolutions. Returning to the FIB-SEM example, for resolutions at the nanometer scale, the effects of optical properties, beam variations, and/or thermal effects may be impossible to completely control to eliminate noise from the images. Accordingly, alternative techniques for reducing noise in high resolution images may be desirable.

BRIEF DESCRIPTION OF THE DRAWINGS

FIG. 1A illustrates an example of a machine learning model to denoise images.

FIG. 1B illustrates another example of a machine learning model to denoise images.

DETAILED DESCRIPTION

Figure 2:
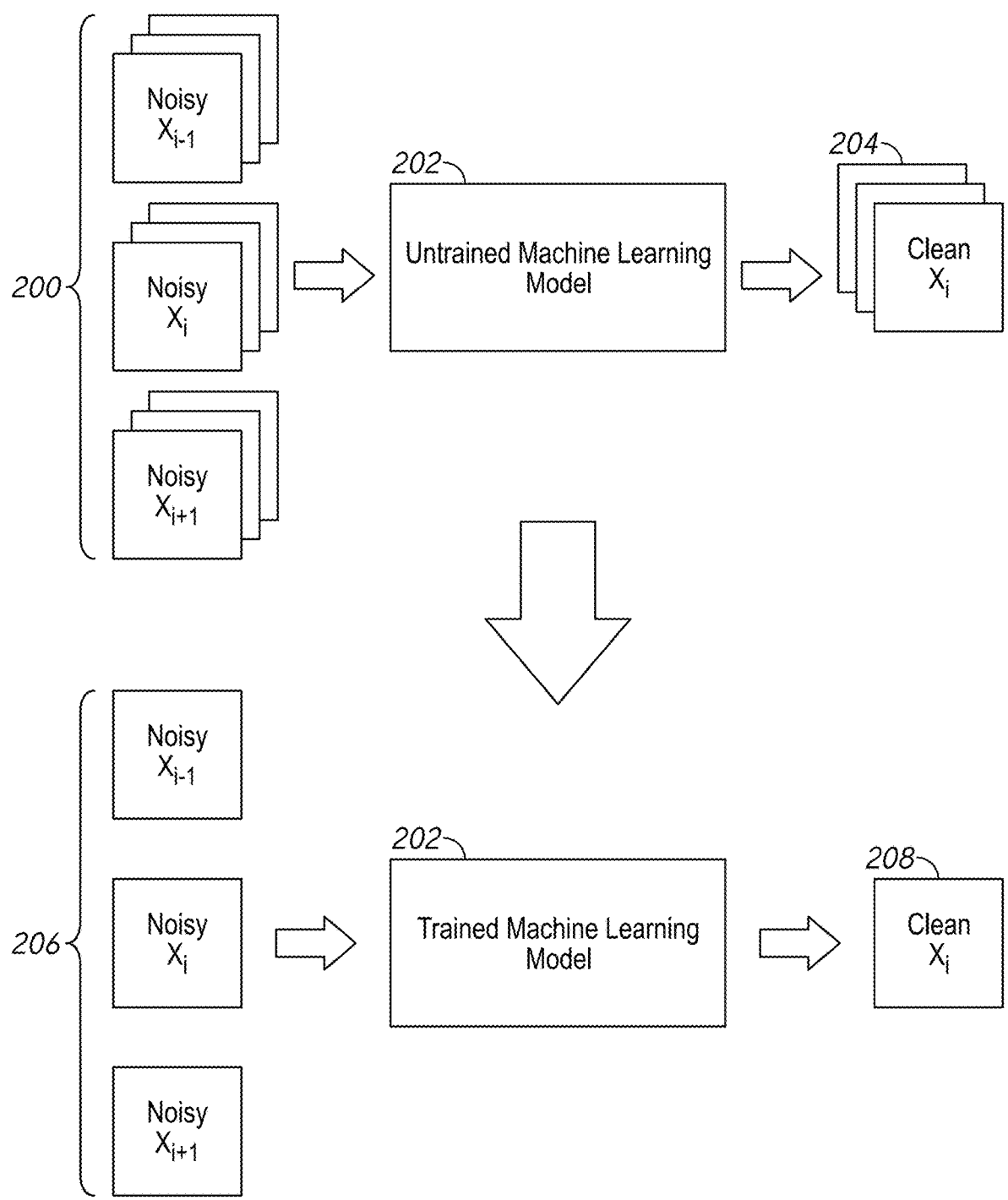
FIG. 2 illustrates a machine learning model to denoise images according to at least one example of the present disclosure.

Image denoising is the process of taking an image, x, including noise n (e.g., a noisy image) and separating the noise from the "true" signal s in the image (e.g., $x=s+n$) to obtain an image with reduced or no noise (e.g., a clean image). In many applications, the noise is random and/or independent (e.g., the noise at one pixel is not dependent on the noise at another pixel). Existing techniques attempt to model the noise in the image in order to remove it. However, modeling the noise may be difficult when multiple sources contribute noise having different characteristics (e.g., Gaussian noise, Poisson noise, etc.). Artificial intelligence (AI) techniques such as machine learning have been utilized to denoise images. For example, machine learning model may be trained to make inferences (e.g., predictions, estimates) that may be used to remove noise from the image and output a "clean" image having reduced or no noise.

Typically, training a machine learning model includes providing a training data set. The training may be supervised or unsupervised or semi-supervised. The training data set is used to determine the architecture and/or other parameters of the machine learning model. For example, the training data set may be used to determine a number of layers in the model and/or weights applied to feature vectors of the model. The trained model may then be used to analyze other data sets to complete one or more tasks, such as providing an output denoised image responsive to an input image.

FIG. 1A illustrates an example of a machine learning model which may be used to denoise images. A machine learning model 104 may be provided a training data set including labeled pairs of images. One image of the pair may be designated as an input "known noisy" image 100 and the other image of the pair may be designated as a desired output "known clean" image 102 (e.g., no noise or reduced noise compared to image 100). Image 100 and image 102 may be the same (e.g., from a same spatial and/or temporal location) other than presence of noise. Known clean images 102 used to train the machine learning model 104 may also be referred to as ground truth images.

From the training set, the machine learning model 104 may learn to identify the "true" signal in the noisy images. By "identify" it is meant the machine learning model 104 is trained to make an inference to provide a prediction and/or estimate of the desired output, here the true signal. The true signal may then be extracted from the noisy image to generate a clean image. During training, acceptable parameters (e.g., network coefficients, weights applied to feature matrices) of the machine learning model 104 are determined based on the how closely an output of the machine learning model 104 based on the parameters and a known noisy image 100 resembles the known clean image 102. Parameters may include values for weights of matrices and/or vectors. The machine learning model 104 may be considered trained once parameters are found that provide outputs based on the known noisy images 100 that most closely resemble the known clean images 102. Once trained (e.g., values for the parameters have been determined), the machine learning model 104 may provide a clean output image 108 responsive to an input noisy image 106 that was not part of the training data set.

The technique described with reference to FIG. 1A utilizes ground truth images to train the machine learning model. However, for high resolution images, such as those at the nanometer scale, noise may be omnipresent. Thus, ground truth images suitable for training the machine learning model may not be available.

FIG. 1B illustrates another example of a machine learning model to denoise images. A machine learning model 114 may be provided a training set including pairs of images, similar to the machine learning model 104. However, one image 110 of a pair includes a first type of noise and another image 112 of the pair includes a second type of noise. Image 110 and image 112 may be the same (e.g., from a same spatial and/or temporal location) other than the type of noise. Based on the training data set including pairs of images with different noise, the machine learning model 114 may learn to identify noise in images. The identified noise may then be removed from the image.

Similar to FIG. 1A, during training, acceptable parameters of the machine learning model 114 may be determined. However, unlike the training of machine learning model 104 in FIG. 1A, the machine learning model 114 may not receive ground truth images during training, only the noisy image pairs 110, 112. Instead, the machine learning model 114 may output a clean image 116 for each of the image pairs. The clean images 116 may be used to calculate a value of a loss function. The value of the loss function may be high when the machine learning model 114 makes poor predictions (e.g., the clean image 116 still contains a significant amount of noise) and may be lower when the machine learning model 114 makes better predictions (e.g., the clean image 116 contains less noise). The parameters may be adjusted during training. The machine learning model 114 may be considered trained when parameters are found that provide a minimum value for the loss function (e.g., the loss function is minimized). Once trained, the machine learning model 114 may provide a clean output image 122 from an input pair of noisy images 118, 120, which may have less noise than the input images.

While the technique described with reference to FIG. 1B provides a potential solution to a lack of ground truth images to train a machine learning model, pairs of images that differ only in noise content may not be available for training or as inputs to the trained model. Images acquired of a temporal process (e.g., mitosis) and/or images acquired by a destructive process may not provide such "matched" pairs of images. For some imaging modalities, acquiring pairs of identical images, other than noise content, while possible, may not be practical, for example, due to the time taken to acquire an image. Accordingly, machine learning models that can be trained to denoise images when ground truth or matching images are not available may be desired.

FIG. 2 illustrates a machine learning model which may be used to denoise images according to at least one example of the present disclosure. During training, a machine learning model 202 may be provided a training set including multiple sequences 200 of noisy images $X_{i-1}$, $X_i$, and $X_{i+1}$, where i is the image number of the sequence. Although sequences including three images are shown FIG. 2, in other examples, sequences may include two images or may include more than two images. Based on the training set of sequences 200, the machine learning model 202 may learn to identify at least some noise in an image $X_i$ of a sequence. The identified noise may then be removed to generate a clean output image corresponding to noisy image $X_i$ of the sequence provided as an input. For example, the machine learning model 202 may learn by conducting a comparison of different pairs of images in the sequence—such as a difference between $X_i$ and $X_{i-1}$ and a difference between $X_i$ and $X_{i+1}$.

Figure 3:
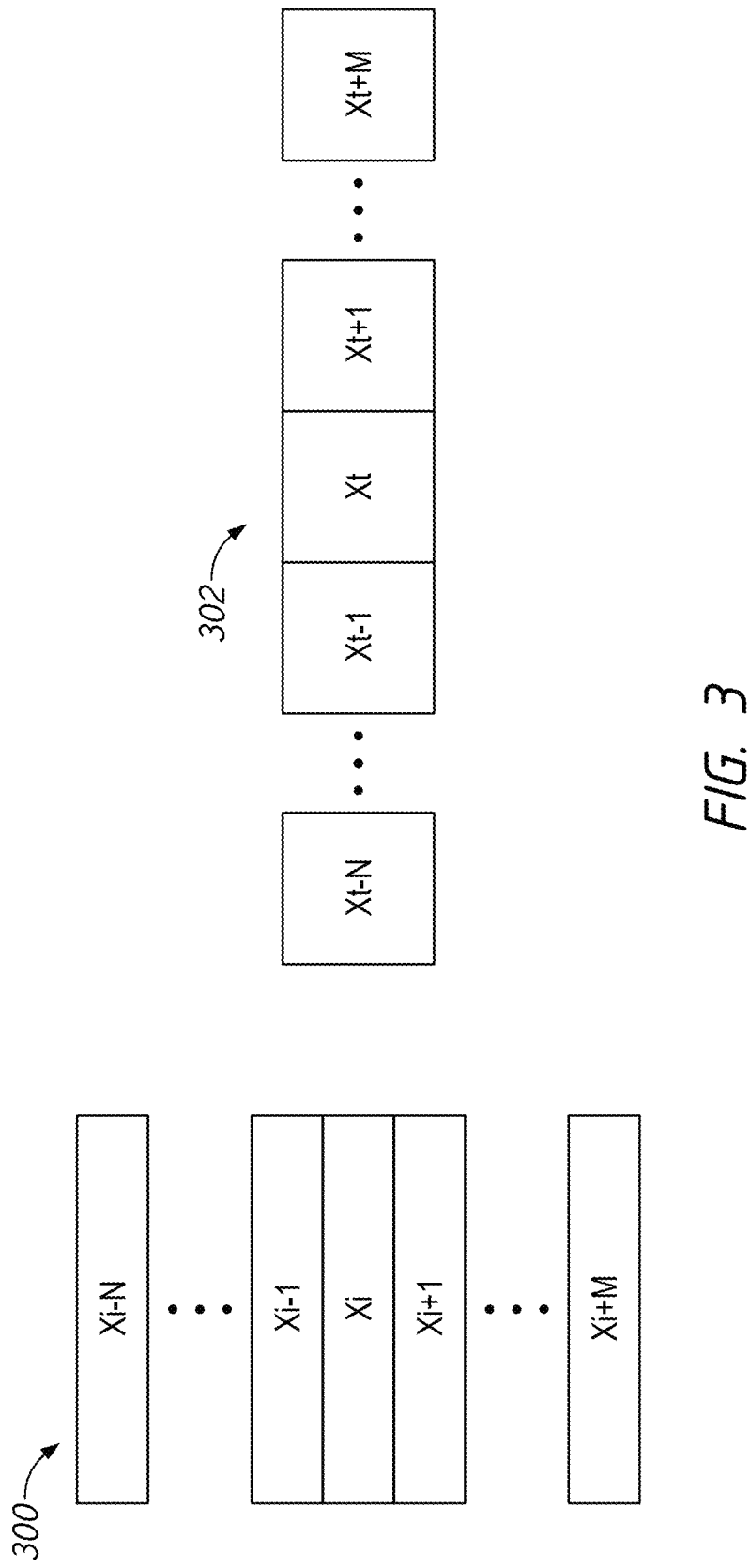
FIG. 3 illustrates sequences of images according to at least one example of the present disclosure.

As shown in FIG. 3, in some examples, a sequence of images 300 that may be provided to machine learning model 202 may correspond to a number of images $X_{i-N}$-$X_{i+M}$ acquired at different spatial locations. For example, the images $X_{i-N}$-$X_{i+M}$ may have been acquired at different image planes within a volume. In some examples, the images may correspond to spatially distinct, non-overlapping image planes. In some examples, the non-overlapping image planes may be directly adjacent to one another. In other examples, the image planes may be spaced apart (e.g., there are portions of a volume between the image planes that were not imaged). In some examples, the images may correspond to image planes that partially overlap (e.g., a portion of a volume present in image $X_{i-1}$ is also present in image $X_i$). In some examples, the thickness of the image planes and/or spacing of the image planes within the volume may be based, at least in part, on the resolution and/or other parameters of the imaging technique used.

Also shown in FIG. 3, in some examples, a sequence of images 302 that may be provided to machine learning model 202 may correspond to a number of images $X_{t-N}$-$X_{t+M}$ acquired at different times. That is, the images may be temporally spaced. The temporal spacing may be based, at least in part, on a frame rate of the imaging technique used in some examples. In some examples, temporally spaced images may be acquired at a same imaging plane. However, in other examples, the images may be both spatially and temporally spaced. In some examples, the spatial and/or temporal spacing of the images in the sequences 300 and 302 may be such that differences between two sequential images (e.g., no intervening images of the sequence between the two images) of the sequence may be small.

Returning to FIG. 2, the machine learning model 202 may include one or more machine learning models that are trained to output a clean image $X_i$ 204 based on noisy image $X_i$ of a sequence 200 and one or more other images from the sequence 200, such as $X_{i+1}$ and/or $X_{i-1}$. In some examples, such as the one shown in FIG. 2, the images of the sequence 200 provided to the machine learning model 202 may be sequential images in relation to image Xi (e.g., directly proceeds or follows image $X_i$ in sequence 200).

Similar to machine learning model 114, machine learning model 202 may not receive ground truth images during training, only the noisy images of the sequences 200 and output a clean image 204 for individual sequences 200. However, unlike the noisy image pairs 110, 112 provided to machine learning model 114, the images of sequences 200 may not be from a same spatial and/or temporal location. The clean images 204 may be used to calculate a value of a loss function. The machine learning model 202 may be considered trained when parameters are found that provide a minimum value for the loss function. Once trained, the machine learning model 202 may provide a clean output image 208 based on an input sequence 206 of noisy images.

The machine learning model 202 may include one or more neural networks. The neural network may have one or more layers. A layer refers to one or more nodes (e.g., computations) that operates on a same input (which may include one or more values) and provides an output (which may include one or more values) either as input to another layer or as an output of the neural network. Various architectures may be used for the neural network. For example, a neural network may have a UNet architecture, a fully-convolutional architecture, or a recurrent neural network (RNN) architecture.

In some applications, RNN may be suitable for making inferences from spatial and/or temporal sequences. The RNN may determine what to "remember" and what to "forget" about images in a sequence in order to make an inference about one or more images in the sequence. For example, an RNN may infer noise in an image of a sequence based on the image and one or more other images of the sequence. In some examples, an RNN may include one or more gated recurrent units and/or a long short-term memory network. In some examples, the machine learning model 202 may have a branched architecture. The branches may each receive as inputs the same noisy images from the sequence 200, 206, different noisy images from the sequence 200, 206, or a combination thereof (e.g., some images received by the branches are the same while others are different). The architecture of the branches may be the same or different. The outputs of the branches may be combined to provide the clean image 204 from the machine learning model 202.

In some examples, the machine learning model 202 may be partially or wholly modular. For example, the machine learning model 202 may include neural networks, one or more layers of a neural network, and/or other components that form modules referred to as building units, and any number of building units may be added or removed from the machine learning model 202. In some examples, individual building units may identify a corresponding portion of noise in an image to be removed. In some applications, the number of building units included in the machine learning model 202 may be based, at least in part, on a magnitude (e.g., severity) of the noise in the images of the sequence 200, 202. In examples, the magnitude of the noise may be indicated by a signal-to-noise ratio (SNR) of the images. In some examples, the magnitude of the noise may be indicated by a type of noise in the images (e.g., Poisson vs. Gaussian). In some examples, the magnitude of the noise may be due, at least in part, on a number of different types of noise included in the image.

In some examples, the clean/denoised images output by the machine learning model 202 may be provided to another machine learning model and/or image processing techniques for further analysis. For example, a machine learning model may be trained to detect cancer cells, cell-to-cell interactions, and/or other features of interest within the clean images (e.g., potential drug targets, indication of treatment efficacy). In other examples, detection or other processing on the clean images may be performed by other image processing techniques such as edge detection, histogram analysis, and speckle analysis. In some examples, the detection of cancer cells and/or other features may be used to make a diagnosis. In some examples, another machine learning model and/or other technique may be used to make the diagnosis.

Although examples provided herein relate to medical and biomedical images, the machine learning model 202 and other models, apparatuses, systems, and methods disclosed herein are not limited to medical applications. For example, images of semiconductor devices, nano-machines, microfluidic devices, or materials may be provided to machine learning model 202 and the clean/denoised images may be analyzed for quality control and/or other purposes.

In some examples, the machine learning model 202 may be implemented in hardware and/or software components. For example, a software-based machine learning model 202 may be implemented using a processor (e.g., single or multi-core central processing unit, a single graphical processing unit (GPU) or GPU cluster, or multiple processors arranged for parallel-processing) configured to execute instructions, which may be stored in a computer readable medium, and which when executed cause the processor to implement the machine learning model. In another example, a hardware-based machine learning model 202 may be implemented using one or more application specific integrated circuits (ASICs).

Figure 4:
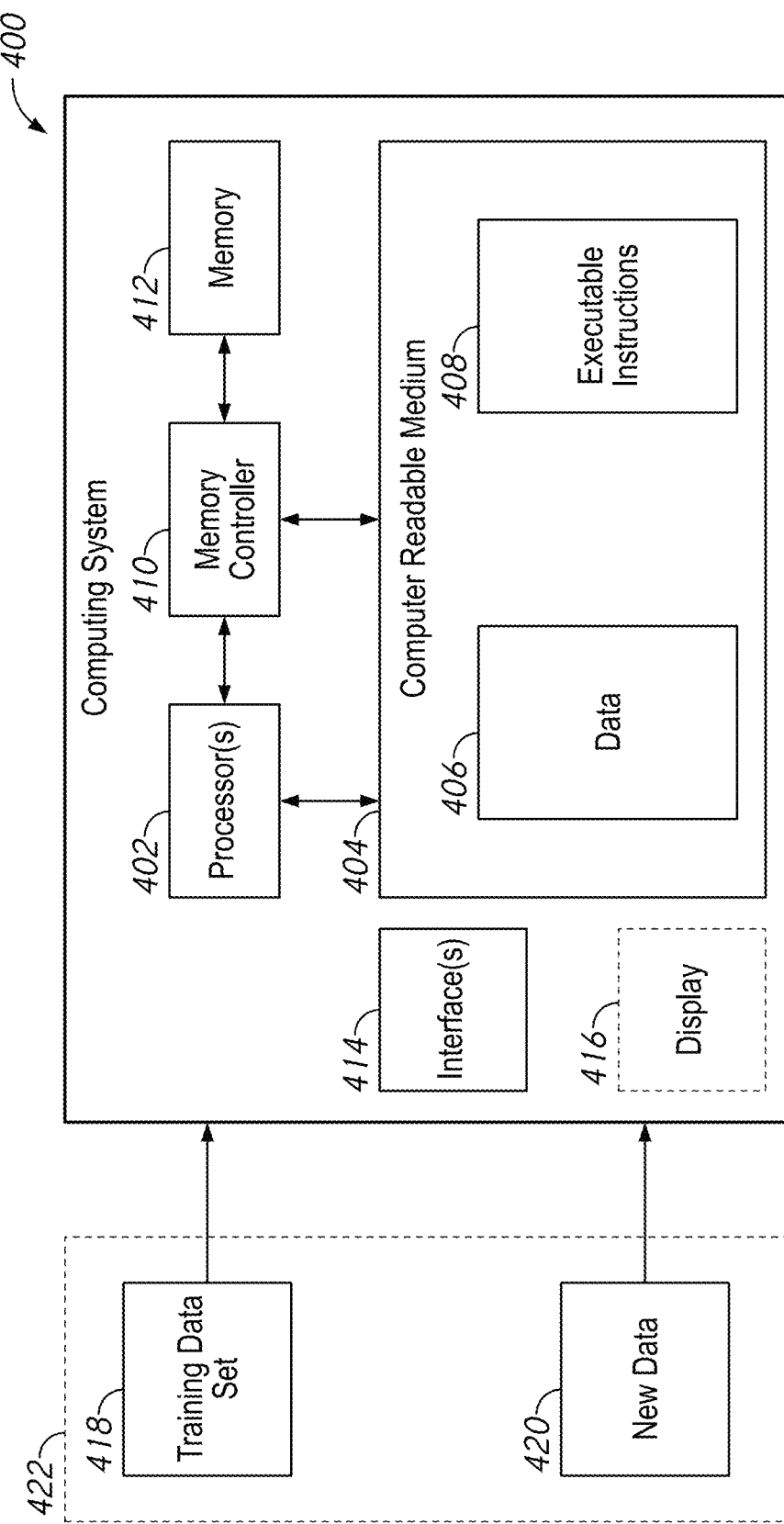
FIG. 4 is a schematic illustration of a computing system arranged in accordance with examples of the present disclosure.

FIG. 4 is a schematic illustration of a computing system arranged in accordance with examples of the present disclosure. The computing system 400 may be used to implement one or more machine learning models, such as machine learning model 202. The computing system 400 may include a processor (or processors) 402, a computer readable medium (or media) 404, a memory controller 410, a memory 412, and an interface (or interfaces) 414. In some examples, the computing system 400 may include a display 416.

The computer readable medium 404 may be accessible to the processor 402. The computer readable medium 404 may be encoded with executable instructions 408. The executable instructions 408 may include executable instructions for implementing a machine learning model to denoise images (e.g., generate clean images from noisy images). The executable instructions 408 may be executed by the processor 402. In some examples, the executable instructions 408 may also include instructions for generating or processing training data sets and/or training a machine learning model. Alternatively or additionally, in some examples, the machine learning model, or a portion thereof, may be implemented in hardware included with the computer readable medium 404 and/or processor 402, for example, application-specific integrated circuits (ASICs) and/or field programmable gate arrays (FPGA).

The computer readable medium 404 may store data 406. In some examples, the data 406 may include one or more training data sets, such as training data set 418. The training data set 418 may include one or more sequences of images. In some examples, training data set 418 may be received from another computing system (e.g., an imaging system 422, a cloud computing system). In other examples, the training data set 418 may be generated by the computing system 400. In some examples, the training data sets may be used to train one or more machine learning models. In some examples, the data 406 may include data used in a machine learning model (e.g., weights, connections between nodes). In some examples, the data 406 may include other data, such as new data 420. The new data 420 may include one or more image sequences not included in the training data set 418. In some examples, the new data may be analyzed by a trained machine learning model to provide a clean (e.g., denoised) image. In some examples, the data 406 may include outputs (e.g., the clean images) generated by one or more machine learning models implemented by the computing system 400. The computer readable medium 404 may be implemented using any medium, including non-transitory computer readable media. Examples include memory, random access memory (RAM), read only memory (ROM), volatile or non-volatile memory, hard drive, solid state drives, or other storage. While a single medium is shown in FIG. 4, multiple media may be used to implement computer readable medium 404.

In some examples, the processor 402 may be implemented using one or more central processing units (CPUs), graphical processing units (GPUs), ASICs, FPGAs, or other processor circuitry. In some examples, the processor 402 may execute some or all of the executable instructions 408. In some examples, the processor 402 may be in communication with a memory 412 via a memory controller 410. In some examples, the memory 412 may be volatile memory, such as dynamic random access memory (DRAM). The memory 412 may provide information to and/or receive information from the processor 402 and/or computer readable medium 404 via the memory controller 410 in some examples. While a single memory 412 and a single memory controller 410 are shown, any number may be used. In some examples, the memory controller 410 may be integrated with the processor 402.

In some examples, the interface 414 may provide a communication interface to another device (e.g., imaging system 422), a user, and/or a network (e.g., LAN, WAN, Internet). The interface 414 may be implemented using a wired and/or wireless interface (e.g., Wi-Fi, BlueTooth, HDMI, USB, etc.). In some examples, the interface 414 may include user interface components which may receive inputs from a use. Examples of user interface components include a keyboard, a mouse, a touch pad, a touch screen, and a microphone. In some examples, the interface 414 may communicate information, which may include user inputs, data 406, training data set 418, and/or new data 420, between external devices (e.g., imaging system 422) and one or more components of the computing system 400 (e.g., processor 402 and computer readable medium 404).

In some examples, the computing system 400 may be in communication with a display 416 that is a separate component (e.g., using a wired and/or wireless connection) or the display 416 may be integrated with the computing system. In some examples, the display 416 may display data 406 such as outputs generated by one or more machine learning models implemented by the computing system 400. Any number or variety of displays may be present, including one or more LED, LCD, plasma, or other display devices.

In some examples, the training data set 418 and/or new data 420 may be provided to the computing system 400 via the interface 414. Optionally, in some examples, some or all of the training data sets 418 and/or new data 420 may be provided to the computing system 400 by an imaging system 422. In some examples, the imaging system 422 may be a FIB-SEM imaging system, a magnetic resonance imaging system, a computed tomography system, an ultrasound imaging system, or a combination thereof. In some examples, computing system 400 may provide results, such as inferences made by a machine learning application, to the imaging system 422. In some examples, the computing system 400 is included in the imaging system 422.

Figure 5:
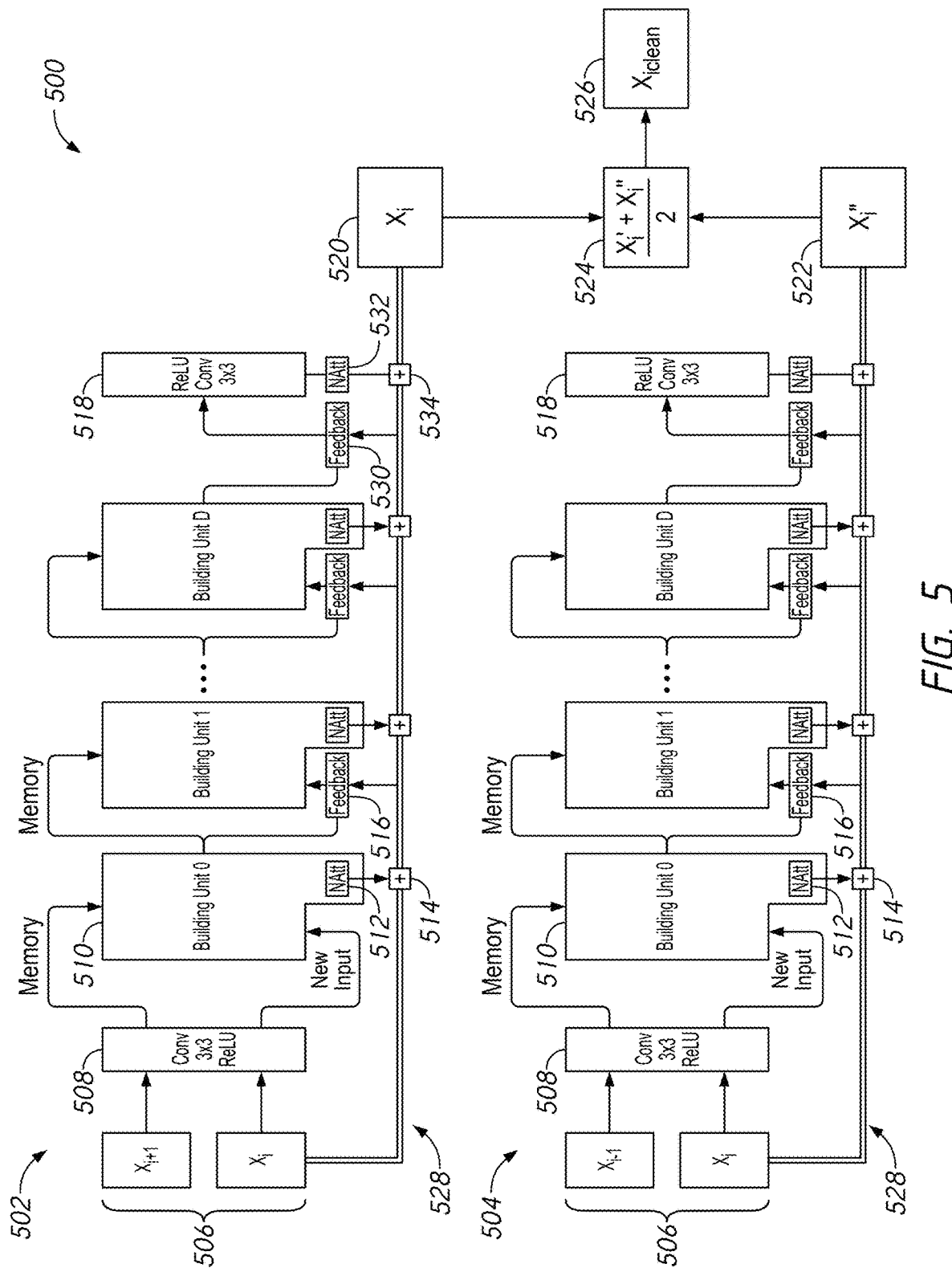
FIG. 5 is a functional block diagram of a machine learning model in accordance with examples of the present disclosure.

FIG. 5 is a functional block diagram of a machine learning model in accordance with examples of the present disclosure. In some examples, the machine learning model 500 may be included in, used to implement, and/or be implemented by machine learning model 202. In some examples, the machine learning model 500 may be implemented by a computing system, such as computing system 400. For example, the computing system may include a non-transitory computer readable medium encoded with instructions that when executed by a processor of the computing system, implement the machine learning model 500. In some examples, the machine learning model 500 may be implemented, in whole or in part, by hardware (e.g., circuitry such as ASICS, programmable FPGAs, etc.).

The machine learning model 500 may be trained (e.g., configured) to denoise an image. The machine learning model 500 may receive noisy images $X_{i-1}$, $X_i$, and $X_{i+1}$ of a sequence of images 506 as inputs and output a clean image $X_{iclean}$ 526, which corresponds to image $X_i$ of the sequence of images 506. By clean, it is meant that at least a portion of the noise of $X_i$ has been removed. In some examples, the sequence of images 506 may include images from different imaging planes (e.g., different planes within a volume). In some examples, the sequence of images 506 may include images from a same imaging plane acquired at different times. In some examples, the sequence of images 506 may include images from both different imaging planes and different times.

The machine learning model 500 includes two branches 502, 504. The branch 502 may receive images $X_i$ and $X_{i+1}$ as inputs and branch 504 may receive images $X_i$ and $X_{i-1}$ as inputs. As shown in the example in FIG. 5, one branch may receive a set of two images from a sequence of images and a second branch may receive a set of two images from the sequence of images. In some examples, more than two images may be received by the branches. In other examples, only one image may be received by the branches. The second branch may receive a different set of images from the sequence of images. In some examples, such as the one shown in FIG. 5, one same image may be provided to both branches (e.g., $X_i$). However, in other examples, all images provided to both branches are different. In some examples, the images provided to each branch may be consecutive images in the sequence or the images may be spaced apart by one or more images in the sequence of images (e.g., $X_i$ and $X_{i+2}$). The images provided to the branches may be evenly spaced in the sequence or may have unequal spacing (e.g., $X_i$ and $X_{i-2}$ may be provided to a branch and $X_i$ and $X_{i-3}$ may be provided to another branch). In some applications, uneven (e.g., non-uniform) spacing may be desirable, for example, when one or more images in the sequence are unusable (e.g., corrupted file).

The branch 502 may output an image $X_i'$ 520, which may have at least some noise removed and branch 504 may output an image $X_i''$ 522, which may have at least some noise removed. The outputs of branches 502 and 504 may be combined to provide the clean image $X_{iclean}$ 526. The outputs may be combined in a variety of ways (e.g., compounded, averaged, weighted average). In the example shown in FIG. 5, an average 524 of the outputs is determined. In the example shown, branches 502, 504 have the same architecture: an RNN. Accordingly, for brevity, only the components and operation of branch 502 will be described herein. However, in other examples, the branches 502, 504 may have different architectures. Branch 502 may include a convolutional/linear rectifier (ConvReLU) layer 508. The ConvReLU layer 508 may convolve and linearly rectify the input images $X_i$ and $X_{i+1}$. In the example shown, the ConvReLU layer 508 applies a 3×3 convolution kernel, but other kernel sizes may be used in other examples. In some examples, the convolution may include 64 channels. In some examples, the channels may be included in a feature vector and/or matrix.

Branch 502 may include one or more additional layers, referred to as building units 510. In the example shown, Branch 502 includes D+1 building units 510, where D is a natural number. In some examples, the number of building units 510 may be based, at least in part, on a magnitude of the noise in the image $X_i$. The building units 510 may be serial in some examples. That is, individual building units 510 may receive an output from a previous layer of branch 502 as an input. For example, building unit 0 receives the output of the ConvReLU layer 508, and each subsequent building unit 510 (building unit 1-D) receives the output of the previous building unit 510 as an input. The ConvRevLU layer 508 may provide two outputs to building unit 0: "memory" and "new input." In some examples, the memory output may include information related to image $X_{i+1}$ and the new input output may include information related to image $X_i$. In some examples, the ConRevLU layer 508 may provide a single output including information related to both images $X_{i+1}$ and $X_i$, but the output is provided to two different portions of the building unit 0. Similarly, the memory output of the building units 510 may be provided to two different portions of a subsequent building unit 510. Based at least in part on the inputs, each building unit 510 may identify at least a portion of the noise in the image $X_i$. In some examples, the portion of noise identified by individual building units 510 may be different. The portion of the noise (e.g., noise component) may be provided as an output of the building unit 510 via a noise attention block 512. In some examples, each building unit 510 may identify a different portion of the noise in the image $X_i$.

The image $X_i$ may be provided along a data path 528 where it is iteratively updated to remove noise. Arithmetic blocks 514 along the data path 528 may receive the identified noise from corresponding ones of the building units 510 and remove the identified noise from the image $X_i$ to provide an updated version of the image $X_i$ with the portion of the noise removed to the next arithmetic block 514 along the data path 528. After the first arithmetic block 514 associated with building unit 0, subsequent arithmetic blocks 514 may remove a portion of the noise from an updated image Xi provided by the previous arithmetic block 514.

The updated images Xi generated by the arithmetic blocks 514 may be provided to feedback blocks 516. Feedback blocks 516 may further receive an output from a previous building unit 510 as an input. Based on the updated images $X_i$ and the output from the previous building unit, the feedback blocks 516 may provide an output to a current building unit 510. For example, the feedback block 516 associated with building unit 1 may receive an updated image $X_i$ and an output from building unit 0 to provide an output to building unit 1. In some examples, an additional feedback block 530 may be identical to feedback blocks 516, however, instead of providing an output to a building unit 510, the feedback block 530 provides an output to a linear rectifier/convolution (ReLUConv) layer 518. Although shown separately from building units 510, in some examples, the feedback blocks 516 and/or feedback block 530 may be included with the building units 510 in some examples.

The ReLUConv layer 518 may linearly rectify and convolve the output of the feedback block 530 to provide an output to a noise attention block 532. In the example shown, ReLUConv layer 518 applies a 3×3 convolution kernel, but other kernel sizes may be used in other examples. The noise attention block 532 may be identical to the noise attention blocks 512 in some examples. The noise attention block 532 may provide a portion of identified noise to a final arithmetic block 534. The final arithmetic block 534 may remove the portion of the noise from the updated image $X_i$ received from the previous arithmetic block 514 to provide image $X_i'$ 520.

In operation, multiple layers of the machine learning model (e.g., ConvReLU 508, building units 510, ReLUConv 518) may generate a noise component that is removed from the image $X_i$ at each layer. The building units 510 each accumulate information from images from the sequence 506 (e.g., image $X_i$ and image $X_{i+1}$ or image $X_i$ and image $X_{i-1}$) and generates two outputs. One output is provided via the noise attenuation block 512 to produce the noise component. The other output includes information relating to the images from the sequence 506 provided to a next building unit 510 of the machine learning model 500 as "memory" and/or to a feedback block 516, 530. Thus, the machine learning model 500 may perform an iterative process to denoise image $X_i$.

While the building units 510 may be serial, the operations performed by branch 502 and 504 may be performed in parallel in some examples. In other examples, the operations performed by one branch may be performed prior to performing the operations of the other branch. Although the machine learning model 500 includes two branches, in other examples, the machine learning model 500 may include one branch. In these examples, the output of the one branch, such as $X_i'$ 520 or $X_i''$ 522, may be output as $X_{iclean}$ 526. In some examples, only two images from the sequence rather than three images of the sequence may be provided to the machine learning model 500. In some examples, only image $X_i$ may be provided to the machine learning model 500. In other examples, machine learning model 500 may include more than two branches, and the outputs of the multiple branches may be combined to provide $X_{iclean}$ 526. In some examples, more than three images from the sequence may be provided.

Figure 6:
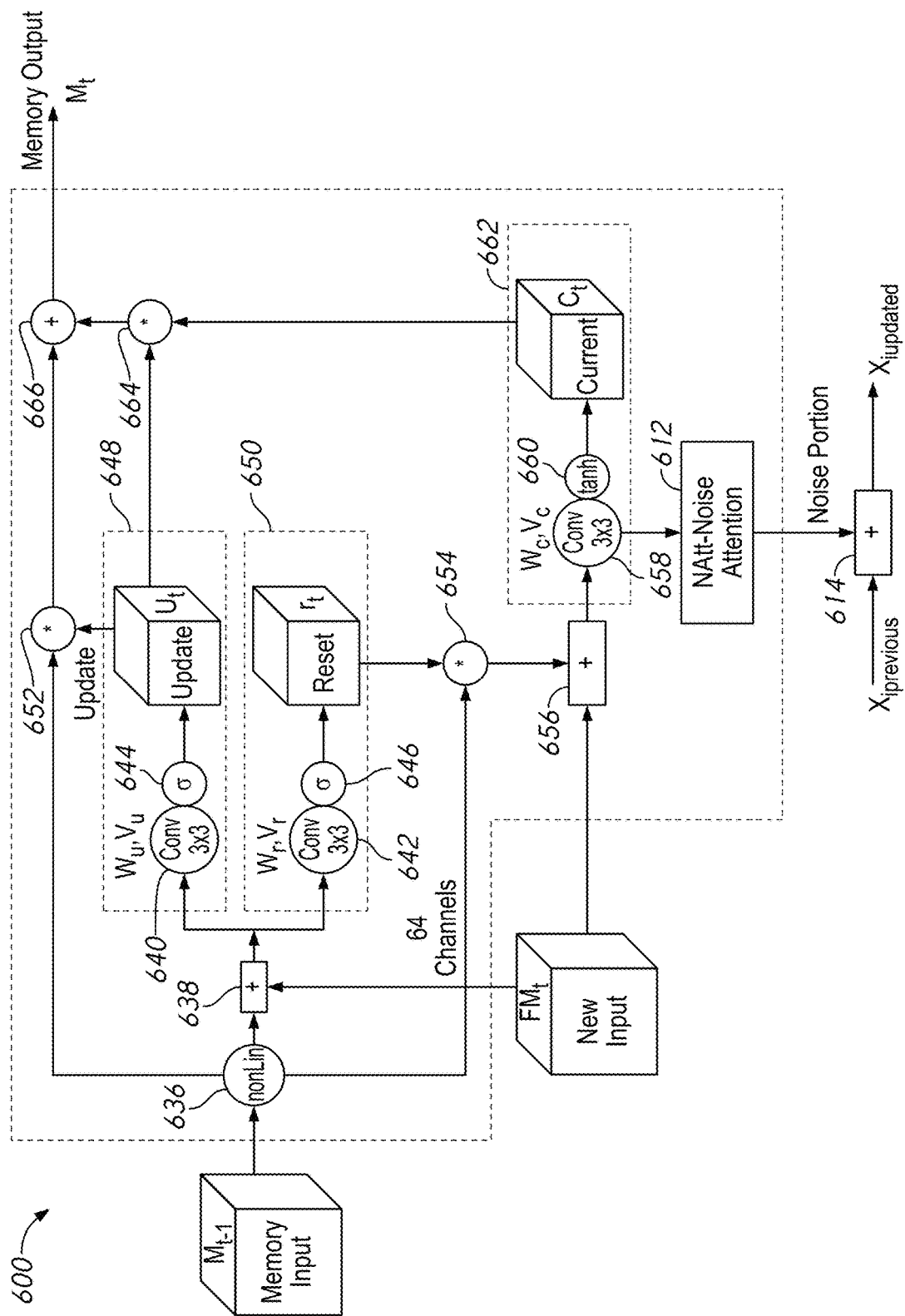
FIG. 6 is a functional block diagram of a building unit in accordance with examples of the present disclosure.

FIG. 6 is a functional block diagram of a building unit in accordance with examples of the present disclosure. In some examples, the building unit 600 may be one of several building units in a RNN and/or other machine learning model. In some examples, the building unit 600 may be used to implement one or more of the building units 510 shown in FIG. 5. In some examples, the building unit 600 may be implemented in hardware and/or software. In some examples, the building unit 600 may be implemented by a computing system, such as computing system 400. For example, the computing system may include a non-transitory computer readable medium encoded with instructions that when executed by a processor of the computing system, implement the building unit 600. The building unit 600 may identify at least a portion of noise in an image $X_i$ of a sequence based, at least in part, on the image $X_i$ and at least one other image in the sequence (e.g., image $X_{i-1}$ and/or image $X_{i+1}$).

In some examples, the building unit 600 may serve as an accumulator. The building unit 600 receives past information or "memory" and new information (e.g., new input). When the building unit 600 is a first building unit (e.g., building unit 0 in FIG. 5), the inputs may be received from a ConvReLU layer (e.g., ConvReLU 508). The memory input and the new input provided by the ConvReLU layer may include information related to images (e.g., image $X_i$ and image $X_{i+1}$ or $X_{i-1}$) provided to a branch of a machine learning model, such as branch 502 and/or branch 504 of machine learning model 500. In some examples, the memory input from the ConvReLU layer may include information related to the at least one other image in the sequence (e.g., $X_{i+1}$ or $Xi_{-i}$) and the new input may include information related to the image $X_i$. When the building unit 600 is a subsequent building unit (e.g., building units 1-D in FIG. 5), the memory input ($M_{t-1}$) may be the output of a previous building unit and the new input ($FM_t$) may be the output of a feedback block (e.g., feedback block 516). In some examples, the new input provided by the feedback block may include information related to the image $X_i$ with a portion of noise identified by a previous building unit removed. In some examples, the new input provided by the feedback block may further include information related to the memory output of the previous building unit.

The building unit 600 may provide a memory output and a noise portion output. In some examples, the memory output may include information related to the at least one other image in the sequence. In some examples, the memory output by the building unit 600 may further include information related to the image $X_i$ prior to removing the noise identified by one or more previous building units. The noise portion may indicate a portion of noise in image $X_i$ identified by the building unit 600. In some examples, the noise portion output may be provided to an arithmetic block 614. In some examples, the information may include a feature matrix and/or vector, which may include values of features extracted from the images.

In some examples, the arithmetic block 614 may include arithmetic block 514. In some examples, arithmetic block 614 may be an adder (e.g., performs an addition operation). As discussed with reference to FIG. 5, the arithmetic block 614 may receive a previous "version" of image $X_i$ ($X_{iprevious}$), which may be the image $X_i$ when provided by a ConvReLU layer or may be image $X_i$ with at least a portion of the noise removed when provided by a previous arithmetic block. The arithmetic block 614 may remove the portion of noise received from the building unit 600 from the image $X_{iprevious}$ and output an updated image $X_{iupdated}$. Thus, image $X_{iupdated}$ may have less noise than image $X_{iprevious}$ in some examples. The image $X_{iupdated}$ may be provided to a next arithmetic block and/or feedback block in some examples.

In some examples, the building unit 600 may resemble a GRU cell with two gates: an update gate 648 and a reset gate 650. The update gate 648 may determine an amount of the inputs provided by a prior layer to retain (e.g., include) in the memory output of the building unit 600. The reset gate 650 may determine an amount of the input received from the previous layer to omit (e.g., exclude) from the memory output. In other words, the update gate 648 determines what information to "remember" and the reset gate 650 determines what information to "forget."

In some examples, the building unit 600 may include a nonlinearity block 636 that may extract features from the memory input. In some examples, the output $\tilde{M}_{t-1}$ of the nonlinearity block 636 may be represented as:

$$\tilde{M}_{t-1} = \tan h(M_{t-1}) \circ \sigma(M_{t-1}) \quad \text{Equation 1}$$

for t=1 . . . D+1, where D is a number of building units 600 in a machine learning model, such as machine learning model 500 and ∘ denotes the Hadamard product. Although the variable t is used as an index for the building units 600 (e.g., layers of the machine learning model), t may not be indicative of time. Rather, in some examples, t may be indicative of a layer of the machine learning model.

An arithmetic block 638 may receive the output from the nonlinearity block 636 (e.g., the extracted features) and combine it with the new input. In some examples, the arithmetic block 638 may sum the new input with the output of the nonlinearity block 636. The output of the arithmetic block 638 may be provided to the update gate 648 and reset gate 650. The update gate 648 may include convolutional block 640 and activation block 644 and reset gate 650 may include convolutional block 642 and activation block 646. Both convolutional blocks 640, 642 may perform convolutions on the output of the arithmetic block 638. In the example shown in FIG. 6, the convolution may utilize a 3×3 kernel, but other size filters may be used in other examples. The output of convolutional block 640 may be provided to activation block 644 and the output of convolutional block 642 may be provided to activation block 646. In some examples, the activation block 644 and/or activation block 646 may apply a sigmoid function to the outputs of the convolutional blocks 640 and 642.

The output of activation block 644 may be provided as the output $u_t$ of the update gate 648. As noted previously, the update gate 648, determines what information to remember. In some examples, the operations performed by the update gate 648 may be provided by:

$$u_t = \sigma(W_u * FM_t + V_u * \tilde{M}_{t-1}) \quad \text{Equation 2}$$

Where $W_u$ is a matrix of weights applied to the new input and $V_u$ is a matrix of weights applied to the memory input, and * denotes the convolution operator. In some examples, the weights may be determined during training of a machine learning model including the building unit 600.

The output of the activation block 646 may be provided as the output $r_t$ of the reset gate 650. The operation of the reset gate 650 to determine what information to forget may be described by the following equation:

$$r_t = \sigma(W_r * FM_t + V_r * \tilde{M}_{t-1}) \quad \text{Equation 3}$$

Where $W_r$ is a matrix of weights applied to the new input and $V_r$ is a matrix of weights applied to the memory input. In some examples, the weights may be determined during training of a machine learning model including the building unit 600.

The output $r_t$ of the reset gate 650 may be provided to arithmetic block 654, which may combine the output with the output $\tilde{M}_{t-1}$ of the nonlinearity block 636. In some examples, the arithmetic block 654 may perform an elementwise multiplication to generate a combined output. The output of arithmetic block 654 and the new input may be provided to arithmetic block 656. In some examples, arithmetic block 656 may sum the new input and the output of the arithmetic block 654 to provide a combined output to a current cell 662.

The current cell 662 may include a convolutional block 658 and an activation block 660. The convolutional block 658 may convolve the output of the arithmetic block 656. In some examples, such as the one shown, the convolution may use a 3×3 kernel, but other sizes may be used in other examples. The output of the convolutional block 658 may be provided to the activation block 660. In some examples, the activation block 660 may include a hyperbolic tangent function. The output of the activation block 660 may be provided as the current output $C_t$ of the current cell 662. The operations of the cell 662 may be represented as:

$$C_t = \tan h(W_c * FM_t + r_t \tilde{M}_{t-1} * V_c) \quad \text{Equation 4}$$

Where $W_c$ is a matrix of weights applied to the new input and $V_c$ is a matrix of weights applied to the memory input. In some examples, the weights may be determined during training of a machine learning model including the building unit 600. The output of the convolutional block 658 may further be provided to a noise attenuation block 612, which may provide the noise portion output of the building unit 600.

Returning to the update gate 648, the output $u_t$ the output of the nonlinearity block 636 may be provided to an arithmetic block 652 and combined. In some examples, the arithmetic block 652 may combine the inputs by performing an elementwise multiplication function. The output $u_t$ and the output $C_t$ may be provided to arithmetic block 664. In some examples, the arithmetic block 664 may combine the inputs by performing an elementwise multiplication function. The outputs of the arithmetic blocks 652 and 664 may be provided to arithmetic block 666. The arithmetic block 666 may combine the two outputs to provide the memory output $M_t$ of the building unit 600. In some examples, the arithmetic block 666 may sum the outputs of the arithmetic blocks 652 and 664. As noted previously, the output $M_t$ may be provided to a subsequent building unit and/or feedback block. Generating the memory output $M_t$ may be provided by the equation:

$$M_t = (1-u_t) \circ \tilde{M}_{t-1} + u_t \circ C_t \quad \text{Equation 5}$$

In some examples, where a first building unit receives inputs from a ConvReLU layer, for Equations 1-5, $M_0 = ReLu(W_0 * (X_{i+1} \text{ or } X_{i-1}))$ and $FM_1 = ReLu(W_0 * X_i)$. Where $W_0$ is a matrix of weights applied to the images. The weights may be determined during training of a machine learning model including the building unit 600. In some examples, some or all of the functions of the building unit 600 may be performed on 64 channels, which may be arranged in a feature matrix of vector. However, more or fewer channels may be used in other examples.

Figure 7:
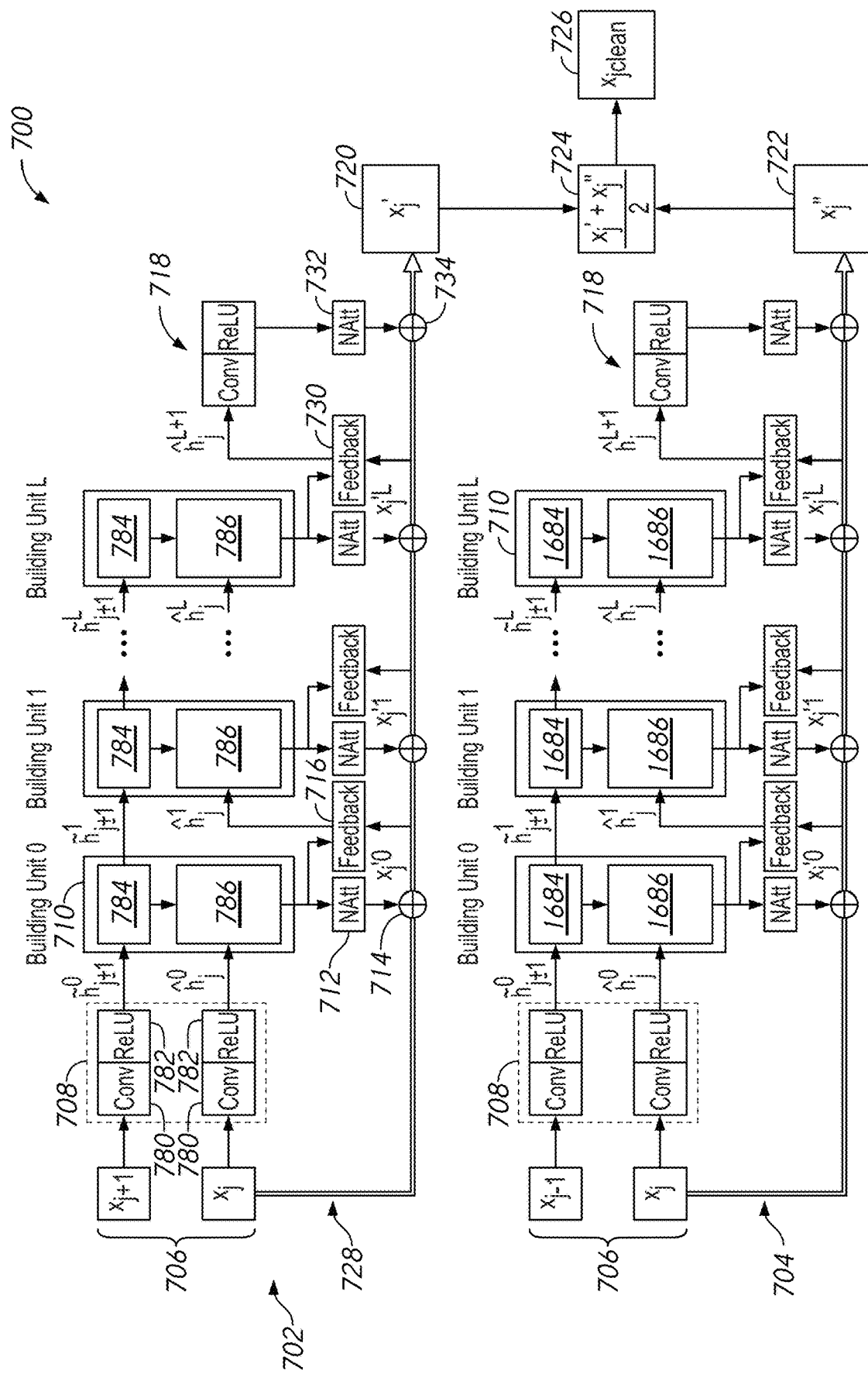
FIG. 7 is a functional block diagram of a machine learning model in accordance with examples of the present disclosure.

FIG. 7 is a functional block diagram of a machine learning model in accordance with examples of the present disclosure. In some examples, the machine learning model 700 may be included in, used to implement, and/or be implemented by machine learning model 202. In some examples, the machine learning model 700 may be implemented by a computing system, such as computing system 400. For example, the computing system may include a non-transitory computer readable medium encoded with instructions that when executed by a processor of the computing system, implement the machine learning model. In some examples, the machine learning model 700 may be implemented, in whole or in part, by hardware (e.g., circuitry such as ASICS, programmable FPGAs, etc.).

The machine learning model 700 may be trained (e.g., configured) to denoise an image. The machine learning model 700 may receive noisy images $X_{j-1}$, $X_j$, and $X_{j+1}$ of a sequence of images 706 as inputs and output a clean image $X_{jclean}$ 726, which corresponds to image $X_j$ of the sequence of images 706. By clean, it is meant that at least a portion of the noise of $X_j$ has been removed. In some examples, the sequence of images 706 may include images from different imaging planes (e.g., different planes within a volume). In some examples, the sequence of images 706 may include images from a same imaging plane acquired at different times. In some examples, the sequence of images 706 may include images from both different imaging planes and different times.

The machine learning model 700 includes two branches 702, 704. The branch 702 may receive images $X_j$ and $X_{j+1}$ as inputs and branch 704 may receive images $X_j$ and $X_{j-1}$ as inputs. As shown in the example in FIG. 7, one branch may receive a set of two images from a sequence of images and a second branch may receive a set of two images from the sequence of images. In some examples, more than two images may be received by the branches. In other examples, only one image may be received by the branches. The second branch may receive a different set of images from the sequence of images. In some examples, such as the one shown in FIG. 7, one same image may be provided to both branches (e.g., $X_j$). However, in other examples, all images provided to both branches are different. In some examples, the images provided to each branch may be consecutive images in the sequence or the images may be spaced apart by one or more images in the sequence of images (e.g., $X_j$ and $X_{j+2}$). The images provided to the branches may be evenly spaced in the sequence or may have unequal spacing (e.g., $X_j$ and $Xj+2$ may be provided to a branch and $X_j$ and $X_{j-3}$ may be provided to another branch). In some applications, uneven (e.g., non-uniform) spacing may be desirable, for example, when one or more images in the sequence are unusable (e.g., corrupted file).

The branch 702 may output an image $X_i'$ 720, which may have at least some noise removed and branch 704 may output an image $X_i''$ 722, which may have at least some noise removed. The outputs of branches 702 and 704 may be combined to provide the clean image $X_{jclean}$ 726. The outputs may be combined in a variety of ways (e.g., compounded, averaged, weighted average). In the example shown in FIG. 7, an average 724 of the outputs is determined. In the example shown, branches 702, 704 have the same architecture: an RNN. Accordingly, for brevity, only the components and operation of branch 702 will be described herein. However, in other examples, the branches 702, 704 may have different architectures. Branch 702 may include a convolutional/rectified linear unit (ConvReLU) layer 708. The ConvReLU layer 708 may perform a convolutional operation as indicated by block 780 and perform a linear rectifying activation operation as indicated by block 782. Thus, ConvReLU layer 708 may convolve and linearly rectify the input images $X_j$ and $X_{j+1}$. The ConvReLU layer 708 may provide an output $\hat{h}_{j+1}^0$ for image $X_{j+1}$ and output $\hat{h}_j^0$ for image $X_j$.

Branch 702 may include one or more additional layers, referred to as building units 710. In the example shown, branch 702 includes L+1 building units 710, where L is a natural number. In some examples, the number of building units 710 may be based, at least in part, on a magnitude of the noise in the image $X_j$. Each building unit 710 may include an upper block 784 and a lower block 786. The upper block 784 may be referred to as a convolver 784 and the lower block 786 may be referred to as a synthesizer 786.

The upper block 784 of the initial building unit 710 (Building Unit 0) may receive the output $\hat{h}_{j+1}^0$ from ConvReLU layer 708 and provide outputs to the synthesizer 786 and an upper block 784 of a subsequent building unit 710 (Building Unit 1). The upper blocks 784 of subsequent building units 710 may receive the output $\hat{h}_{j+1}^i$ of an upper block 784 of a previous building unit 710 to generate outputs. The upper block 784 of the final building unit (Building Unit L) may provide an output to the synthesizer 786.

The synthesizer 786 of the initial building unit 710 may receive the output $\hat{h}^0_j$ from ConvReLU layer 708 and provide an output to a noise attention block 712 and/or a feedback block 716. The synthesizer 786 of subsequent building units 710 may receive the output $\hat{h}^l_j$ of a feedback block 716. In some examples, the upper block 784 may primarily learn information from the image $x_{j+1}$ and the synthesizer 786 may primarily learn information from previous building units 710 and/or ConvReLU layer 708. The upper block 784 and/or synthesizer 786 may learn additional information from other sources in some examples.

Based at least in part on the inputs, each building unit 710 may identify at least a portion of the noise in the image $X_j$. In some examples, the portion of noise identified by individual building units 710 may be different. The portion of the noise (e.g., noise component) may be provided via a noise attention block 712. The portion of the noise may be provided as a feature vector in some examples. Although shown separately in FIG. 7, in some examples, the noise attention block 712 may be included in building unit 710 in some examples, similar to the building unit 510 shown in FIG. 5.

The image $X_j$ may be provided along a data path 728 where it is iteratively updated to remove noise. Arithmetic blocks 714 along the data path 728 may receive the identified noise from corresponding ones of the noise attention blocks 712 and remove the identified noise from the image $X_j$ to provide an updated version of the image $X'^l_j$ (e.g., $x'^0_j$, $x'^1_j$ ... $x'^L_j$) with the portion of the noise removed to the next arithmetic block 714 along the data path 728. After the first arithmetic block 714 associated with building unit 0, subsequent arithmetic blocks 714 may remove a portion of the noise from an updated image $X'^l_j$ provided by the previous arithmetic block 714. For example, the arithmetic block 714 associated with building unit 0 may provide updated image $x'^0_j$ to the arithmetic block 714 associated with building unit 1 which may remove a portion of the noise from the updated image $x'^0_j$ to provide updated image $x'^1_j$.

The updated images $X'^l_j$ generated by the arithmetic blocks 714 may be provided to feedback blocks 716. Feedback blocks 716 may further receive an output from a previous building unit 710 as an input. Based on the updated images $X'^l_j$ and the output from the previous building unit 710, the feedback blocks 716 may provide an output $\hat{h}^l_j$ to a current building unit 710. For example, the feedback block 716 that provides an input to building unit 1 may receive an updated image $X'^0_j$ and an output from building unit 0 to provide an output $\hat{h}^1_j$ to building unit 1. In some examples, an additional feedback block 730 may be identical to feedback blocks 716, however, instead of providing an output to a building unit 710, the feedback block 730 provides an output to a ConvReLU layer 718. Although shown separately from building units 710, in some examples, the feedback blocks 716 and/or feedback block 730 may be included with the building units 710 in some examples.

The ConvReLU layer 718 may be the same as ConvReLU layer 708 in some examples. The ConvReLU layer 718 may perform a convolution and a linear rectifying activation on the output $\hat{h}^{*L+1}_j$ of feedback block 730 to provide an output to a noise attention block 732. In some examples, ConvReLU layer 708 and/or ConReLU layer 718 may applies a 3×3 convolution kernel with a 64 channel feature vector, but other kernel sizes and/or number of channels may be used in other examples. The noise attention block 732 may be identical to the noise attention blocks 712 in some examples. The noise attention block 732 may provide a portion of identified noise to a final arithmetic block 734. The final arithmetic block 734 may remove the portion of the noise from the updated image $X'^L_j$ received from the previous arithmetic block 714 to provide image $X_j'$ 720.

In operation, multiple layers of the machine learning model (e.g., ConvReLU 708, 718, building units 710) may generate a noise component that is removed from the image $X_j$ at each layer. The building units 710 each accumulate information from images from the sequence 706 (e.g., image $X_j$ and image $X_{j+1}$ or image $X_j$ and image $X_{j-1}$) and generate two outputs. One output is provided by the synthesizer 786 to the noise attenuation block 712 to produce the noise component and to the feedback block 716. The other output is provided by the upper block 784 to a subsequent building unit 710. Thus, the machine learning model 700 may perform an iterative process to denoise image $X_j$.

In some examples, the operations performed by branches 702 and 704 may be performed in parallel. In other examples, the operations performed by each branch may be performed serially (e.g., a result of branch 702 is generated prior to beginning generation of a result of branch 704). Although the machine learning model 700 includes two branches, in other examples, the machine learning model 700 may include one branch. In these examples, the output of the one branch, such as $X_j'$ 720 or $X_j''$ 722, may be output as $X_{jclean}$ 726. In some examples, only two images from the sequence rather than three images of the sequence may be provided to the machine learning model 700. In some examples, only image $X_j$ may be provided to the machine learning model 700. In other examples, machine learning model 700 may include more than two branches, and the outputs of the multiple branches may be combined to provide $X_{jclean}$ 726. In some examples, more than three images from the sequence may be provided.

Figure 8:
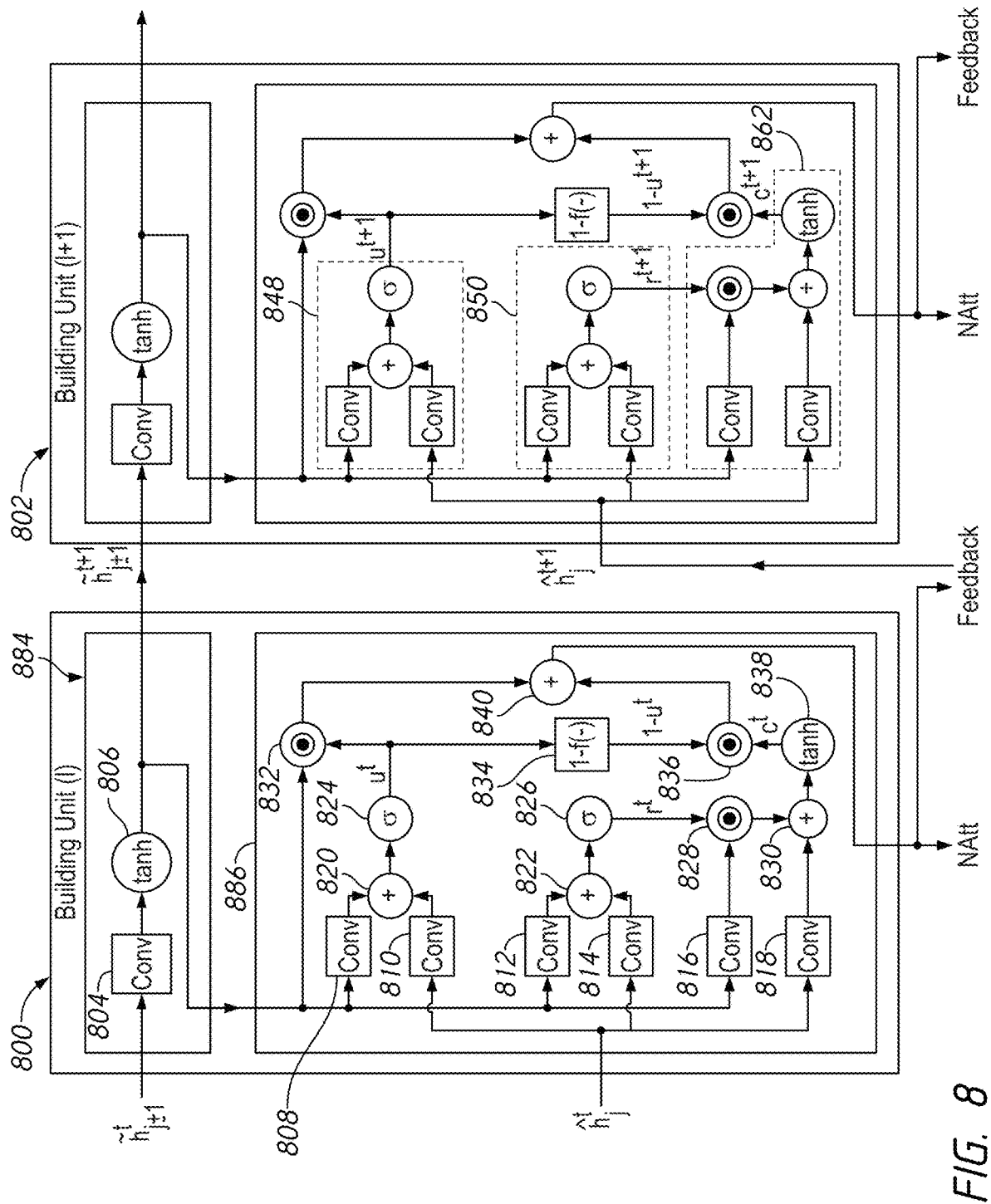
FIG. 8 is a functional block diagram of building units in accordance with examples of the present disclosure.

FIG. 8 is a functional block diagram of building units in accordance with examples of the present disclosure. In some examples, the building unit 800 and/or building unit 802 may be two of several (more than two) building units in a RNN and/or other machine learning model, such as machine learning model 202 and/or machine learning model 700. Although two building units 800, 802 are shown in FIG. 8, in some examples, a machine learning model may only include one building unit (e.g., either 800 or 802). In some examples, the building unit 800 may be used to implement one or more of the building units 710 shown in FIG. 7. In some examples, the building unit 800 and/or 802 may be implemented in hardware and/or software. In some examples, the building unit 800 and/or 802 may be implemented by a computing system, such as computing system 400. For example, the computing system may include a non-transitory computer readable medium encoded with instructions that when executed by a processor of the computing system, implement the building unit(s). The building unit 800 and/or 802 may identify at least a portion of noise in an image $X_j$ of a sequence based, at least in part, on the image $X_j$ and at least one other image in the sequence (e.g., image $X_{j-1}$ and/or image $X_{j+1}$). In some examples, such as the one shown in FIG. 8, the building units 800 and 802 may be the same or substantially similar. To avoid obscuring the disclosure, only the individual components of building unit 800 are provided with reference numerals and groups of components that are part of functional groups (e.g., gates) are labeled in building unit 802. For brevity, only the operation of building unit 800 is described in detail, and building unit 802 may operate in the same or substantially the same manner as building unit 800.

In some examples, the building unit 800 may serve as an accumulator. The building unit 800 receives two inputs: $\tilde{h}_{j\pm}^{0l}$ at an upper block 884, referred to as a convolver, and $\hat{h}^l_j$ at a lower block 886, referred to as a synthesizer. When the building unit 800 is a first building unit (e.g., building unit 0 in FIG. 7), the inputs may be received from a ConvReLU layer (e.g., ConvReLU 708). The inputs provided by the ConvReLU layer may include information related to images (e.g., image $X_j$ and image $X_{j+1}$ or $X_{j-1}$) provided to a branch of a machine learning model, such as branch 702 and/or branch 704 of machine learning model 700. In some examples, the input $\tilde{h}_{j\pm l}^l$ from the ConvReLU layer may include information related to the at least one other image in the sequence (e.g., $X_{j+1}$ or $Xj_{-1}$) and the input $\hat{h}^l_j$ may include information related to the image $X_j$. When the building unit 800 is a subsequent building unit (e.g., building unit 802), the input to the upper block 884 may be the output of a previous building unit and the input to the synthesizer 886 may be the output of a feedback block (e.g., feedback block 716).

The building unit 800 may provide two outputs $\tilde{h}_{j\pm 1}^{l+1}$ and $\hat{h}^{l+}_j$. The output $\tilde{h}_{j\pm 1}^{l+1}$, may be provided to an upper block 884 of a subsequent building unit (e.g., building unit 802). If the building unit 800 is a final building unit, in some examples, it may not provide output $\tilde{h}_{j+1}^{l\pm 1}$. The output $\hat{h}^{l+1}_j$ may be provided to a noise attention block and a feedback block (not shown). For example, $\hat{h}^{l+1}_j$ may be provided to noise attention block 712 and $\hat{h}^{l+1}_j$ may be provided to feedback block 716. In some examples, the feedback block may replace one channel of a multichannel (e.g., 64 channels) feature vector, thus, for simplicity, the same notation of $\hat{h}^{l+1}_j$ is used in FIG. 8 for both the output of the building unit 800 and the feedback block.

The upper block 884 may include a convolutional block 804 and an activation block 806. The convolutional block 804 may perform a convolutional operation on the input and provide an output to the activation block 806. The activation block 806 may perform an activation function on the output of the convolutional block 804 to generate the output $\tilde{h}j\pm 1^{l\pm 1}$. The activation block 806 may include a hyperbolic tangent function in some examples. The output $\tilde{h}_{j\pm 1}^{l\pm 1}$ may be provided to an upper block 884 of a subsequent building unit and to the synthesizer 886 of the current building unit in some examples.

In some examples, the synthesizer 886 may resemble a GRU cell with two gates: an update gate 848 and a reset gate 850. The update gate 848 may determine an amount of the inputs provided by a prior layer to retain (e.g., include) in the output of the synthesizer 886. The reset gate 850 may determine an amount of the inputs received from the previous layer to omit (e.g., exclude) from the outputs. In other words, the update gate 848 determines what information to use and/or "remember" and the reset gate 850 determines what information to not use and/or "forget." The output of the reset gate 850 may be used by a current cell 862 to generate an output that is combined with an output of the update gate 848 to provide the output $\hat{h}^{l+1}_j$ from the synthesizer 886.

The update gate 848 may include convolutional blocks 808 and 810. Convolutional block 808 may receive the output of the upper block 884 and convolutional block 810 may receive $\hat{h}^l_j$. The convolutional blocks 808 and 810 may perform convolutional operations on their respective inputs and provide respective outputs to arithmetic block 820, which may perform a summation (e.g., addition) operation on the convolutions. The output of the arithmetic block 820 may be provided to an activation block 824, which may perform an activation operation on the summed convolutions to provide an output $u^l$ of the update gate 848. In some examples, the activation block 824 may include a sigmoid function.

The reset gate 850 may include convolutional blocks 812 and 814. Convolutional block 812 may receive the output of the upper block 884 and convolutional block 814 may receive $\hat{h}^l_j$. The convolutional blocks 812 and 814 may perform convolutional operations on their respective inputs and provide respective outputs to arithmetic block 822, which may perform a summation (e.g., addition) operation on the convolutions. The output of the arithmetic block 822 may be provided to an activation block 826, which may perform an activation operation on the summed convolutions to provide an output $r^l$ of the reset gate 850. In some examples, the activation block 822 may include a sigmoid function.

The current cell 862 may include convolutional blocks 816 and 818. Convolutional block 816 may receive the output of the upper block 884 and convolutional block 818 may receive $\hat{h}^l_j$. The convolutional block 816 may perform a convolutional operation on the output of the upper block 884 and provide the output to arithmetic block 828. The arithmetic block 828 may further receive the output $r^l$ of the reset gate 850 and perform an elementwise multiplication operation on the output of convolutional block 816 and $r^l$. The convolutional block 818 may perform a convolutional operation on $\hat{h}^l_j$ and provide the output to arithmetic block 830. The arithmetic block 830 may sum the outputs of arithmetic block 828 and convolutional block 818. The output of arithmetic block 830 may be provided to an activation block 838, which may perform an activation operation to generate the output $c^l$ of the current cell 862. In some examples, the activation block 838 may include a hyperbolic tangent function.

The output $u^l$ of the update gate 848 may be provided to a unity function block 834, which may generate an output $1-u^l$. An arithmetic block 836 may elementwise multiply the output $1-u^l$ with the output $c^l$ of the current cell 862. The output of the update gate 848 may also be provided to arithmetic block 832. The arithmetic block 832 may further receive the output of the upper block 884 and elementwise multiply the inputs. The output of arithmetic block 832 and the output of arithmetic block 836 may be provided to arithmetic block 840, which may sum the inputs to generate the output $\hat{h}^{l+1}_j$.

The operations of the building unit 800 may be summarized by the equations provided below where * indicates convolution and ∘ denotes the Hadamard product.

$$\tilde{h}_{j\pm 1}^{l+1} = \tan h(W_1 * \tilde{h}_{j\pm 1}^l) \qquad \text{Equation 6}$$

$$u^l = \sigma(W_u * \hat{h}_j^l + V_u * \tilde{h}_{j\pm 1}^{l+1}) \qquad \text{Equation 7}$$

$$r^l = \sigma(W_r * \hat{h}_j^l + V_r * \tilde{h}_{j\pm 1}^{l+1}) \qquad \text{Equation 8}$$

$$c^l = \tan h(W_c * \hat{h}_j^l + r^l \circ \tilde{h}_{j\pm 1}^{l+1} * V_c) \qquad \text{Equation 9}$$

$$\hat{h}_j^{l+1} = (1-u^l) \circ \tilde{h}_{j\pm 1}^{l+1} + u^l \circ c^l \qquad \text{Equation 10}$$

$$\tilde{h}_{j\pm 1}^0 = \text{ReLU}(W_0 * x_{j\pm 1}) \qquad \text{Equation 11}$$

$$\hat{h}_j^0 = \text{ReLU}(W_0 * x_j) \qquad \text{Equation 12}$$

Where $l \in \{0, \ldots L\}$, $j \in \{0, \ldots N \times M\}$, where N is a number of samples and M is a number of images acquired from each sample, and $W_1$ is a shared parameter across all building units. $W_O$, $W_I$, $W_u$, $W_r$, $W_c$, $V_u$, $V_r$, and $V_c$ are matrices of weights that applied to the respective inputs. The weights may be determined during training of the machine learning model including building unit 800 and/or building unit 802.

Figure 9:
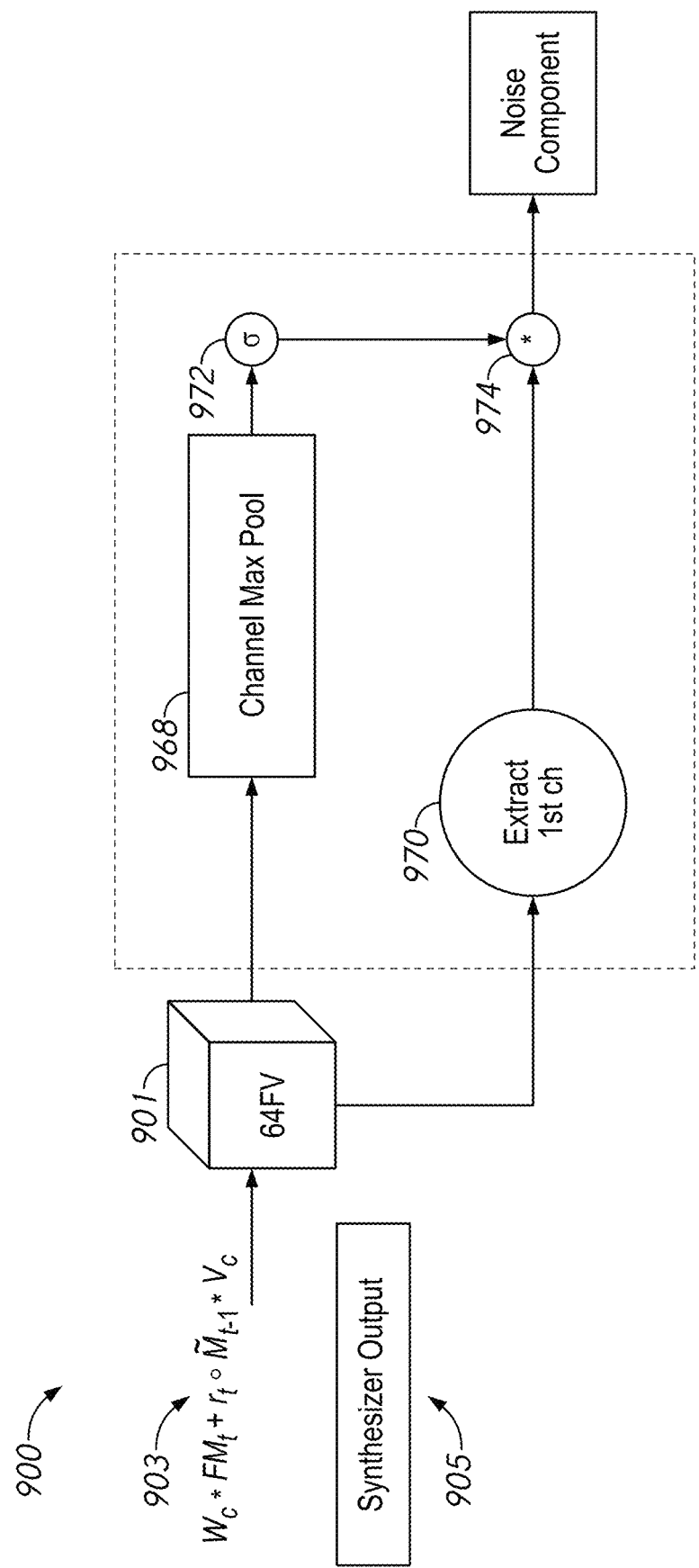
FIG. 9 is a functional block diagram of a noise attention block in accordance with examples of the present disclosure.

FIG. 9 is a functional block diagram of a noise attention block in accordance with examples of the present disclosure. The noise attention block 900 may be used to implement one or more of noise attention blocks 512, 534, 612, 712, and/or 1732. In some examples, the noise attention block 900 may be implemented by a computing system, such as computing system 400. For example, the computing system may include a non-transitory computer readable medium encoded with instructions that when executed by a processor of the computing system 400, implement the noise attention block 900. In some examples, the noise attention block 900 may be implemented, in whole or in part, by hardware (e.g., circuitry such as ASICS, programmable FPGAs, etc.). The noise attention block 900 may provide a portion of noise (e.g., a noise component) of an image $X_i$ of a sequence as an output.

The noise attention block 900 may receive a feature vector 901 as an input. In the example shown, the feature vector 901 includes 64 channels, but may include more or fewer channels in other examples. In some examples, the feature vector 901 may be the result of convolutional operation, such as the one indicated by equation 903. In some examples, the convolutional operation may have been performed by a convolutional block of a cell, such as convolutional block 658 of cell 662. In some examples, the feature vector 901 may be the output of a synthesizer 905, such as synthesizer 786 and/or 886.

The noise attention block 900 may include a max pool block 968 that max pools the channels of the feature vector 901. In some examples, the output of the max pool block 968 may be provided to an activation block 972 to generate an attention map. The activation function block 972 may include a sigmoid function in some examples. The feature vector 901 may also be provided to an extraction block 970, which may extract a channel from the feature vector 901. In some examples, such as the one shown in FIG. 9, the extraction block 970 may extract the first channel from the feature vector 901 (e.g., channel 0 in some examples). The extracted channel and the attention map may be provided to an arithmetic block 974. In some examples, the arithmetic block 974 may elementwise multiply the extracted channel and the attention map to provide the noise component (e.g., portion of noise) as an output. The output may be provided to an adder block, such as adder block 514, 614, and/or 714. The adder block may remove the portion of noise provided from the noise attention block 900 from the image $X_i$ and provide a less noisy (e.g., denoised) image. In some examples, the adder block may include an adder.

Figure 10:
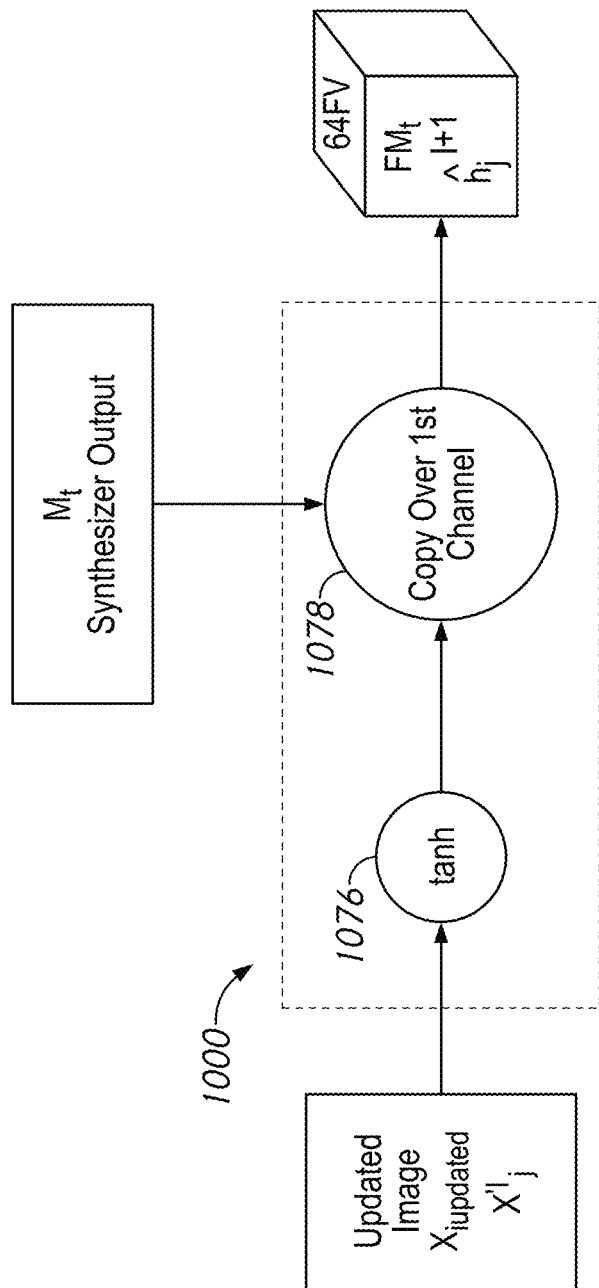
FIG. 10 is a functional block diagram of a feedback block in accordance with examples of the present disclosure.

FIG. 10 is a functional block diagram of a feedback block in accordance with examples of the present disclosure. In some examples, the feedback block 1000 may be used to implement one or more of feedback blocks 516, 530, 716, 730. In some examples, feedback block 1000 may be implemented by a computing system, such as computing system 400. For example, the computing system may include a non-transitory computer readable medium encoded with instructions that when executed by a processor of the computing system, implement the feedback block 1000. In some examples, the feedback block 1000 may be implemented, in whole or in part, by hardware (e.g., circuitry such as ASICS, programmable FPGAs, etc.). In some examples, the feedback block 1000 may receive an output $M_t$ of a building unit, such as building unit 510 and/or building unit 600 as an input. In some examples, the feedback block 1000 may receive an output of a synthesizer, such as synthesizer 786 and/or 886. In some examples, the feedback block 1000 may receive an updated image $X_{i_{updated}}$, $X^{i'}_j$ from an adder block, such as adder block 514, 614, and/or 714.

The feedback block 1000 may include an activation block 1076, which receives the updated image as an input. In some examples, the activation block 1076 may include a hyperbolic tangent function. The feedback block 1000 may include a copy block 1078 that receives the output of the activation block 1076 and the output $M_t$ from the building unit and/or output from the synthesizer. The output provided to the activation block 1076 may include multiple channels in some examples. The copy block 1078 may copy the output of the activation block 1076 over a channel of the output provided to the feedback block 1000. In some examples, the copy block 1078 may copy the output over the first channel (e.g., channel 0 in some examples) of the output $M_t$ or output of the synthesizer The output of the copy block 1078 may be provided as feedback $FM_t$ and/or feedback $\hat{h}^{l+1}_j$ output from the feedback block 1000. In some examples, such as the one shown in FIG. 10, the feedback $FM_t$, $\hat{h}^{l+1}_j$ may include a feature vector having 64 channels. In other examples, the feedback $FM_t$, $\hat{h}^{l+1}_j$ may have more or fewer channels. In some examples, the feedback $FM_t$, $\hat{h}^{l+1}_j$ may be provided to a building unit and/or another layer, such as ReLUConv layer 518 and/or ConvReLU layer 718.

Any of the machine learning models disclosed herein, including the machine learning models 200, 500, and/or 700, portions of a machine learning model, such as layers, building units (e.g., building units 510, 710, 600, 800, and 802), arithmetic blocks, convolutional blocks, noise attention blocks, feedback blocks, convolvers, synthesizers, and/or other blocks or units, may be implemented in hardware, software, or a combination thereof. For example, any of the machine learning models disclosed herein may be implemented by a computing system, such as computing system 400. For example, the computing system may include a non-transitory computer readable medium encoded with instructions that when executed by a processor (or processors) of the computing system, implement the machine learning model or one or more portions thereof. In some examples, any or all of the machine learning models, or portions thereof, disclosed herein may be implemented, in whole or in part, by circuitry such as ASICS, programmable FPGAs, logic circuits (e.g., logic), or other hardware.

In some examples, the instructions encoded in the non-transitory computer readable medium may correspond to a software program that includes one or more modules that include code corresponding to one or more instructions that implement some or all of the machine learning model. For example, a module may include instructions that implement a noise attention block (e.g., noise attention block 900). In some examples a module may include sub-modules that includes instructions that implement sub-portions of a portion of a machine learning model. For example, a module for implementing a building unit of a machine learning model may include a sub-module including instructions to implement a convolver (e.g., convolver 784, 884) and another sub-module including instructions to implement a synthesizer (e.g., synthesizer 786, 886). Other techniques of organizing/structuring the software for providing the instructions that implement the machine learning model (or portions thereof) when executed by one or more processors may also be used in other examples.

Although FIGS. 2-10 have been described with reference to images of a sequence, the apparatuses, models, systems, and techniques described may also be applied to portions of images. For example, in biomedical imaging, image file sizes may be several hundred megabytes or more (e.g., gigabytes). Readily available computing systems and/or hardware components may not be capable of implementing a machine learning model to process entire image files at once. In these situations, the images of the sequence (e.g., $X_i$, $X_{i+1}$, $X_{i-1}$) may be subdivided into sub-images prior to being provided to the machine learning model. The sub-images may be analyzed by the machine learning model individually to provide outputs for individual sub-images. The outputs for the sub-images may then be reconstructed into the full images of the sequence.

In some applications, the ability to sub-divide the images may provide advantages over other techniques. For example, some image processing techniques derive information from the entire image in order to recognize the true signal in the image and/or the noise signal in an image. However, because the techniques disclosed herein use different images from a sequence of images, when corresponding sub-images from the two images are provided, similar or same results will be obtained compared to when the entire images are processed at once.

Figure 11A:
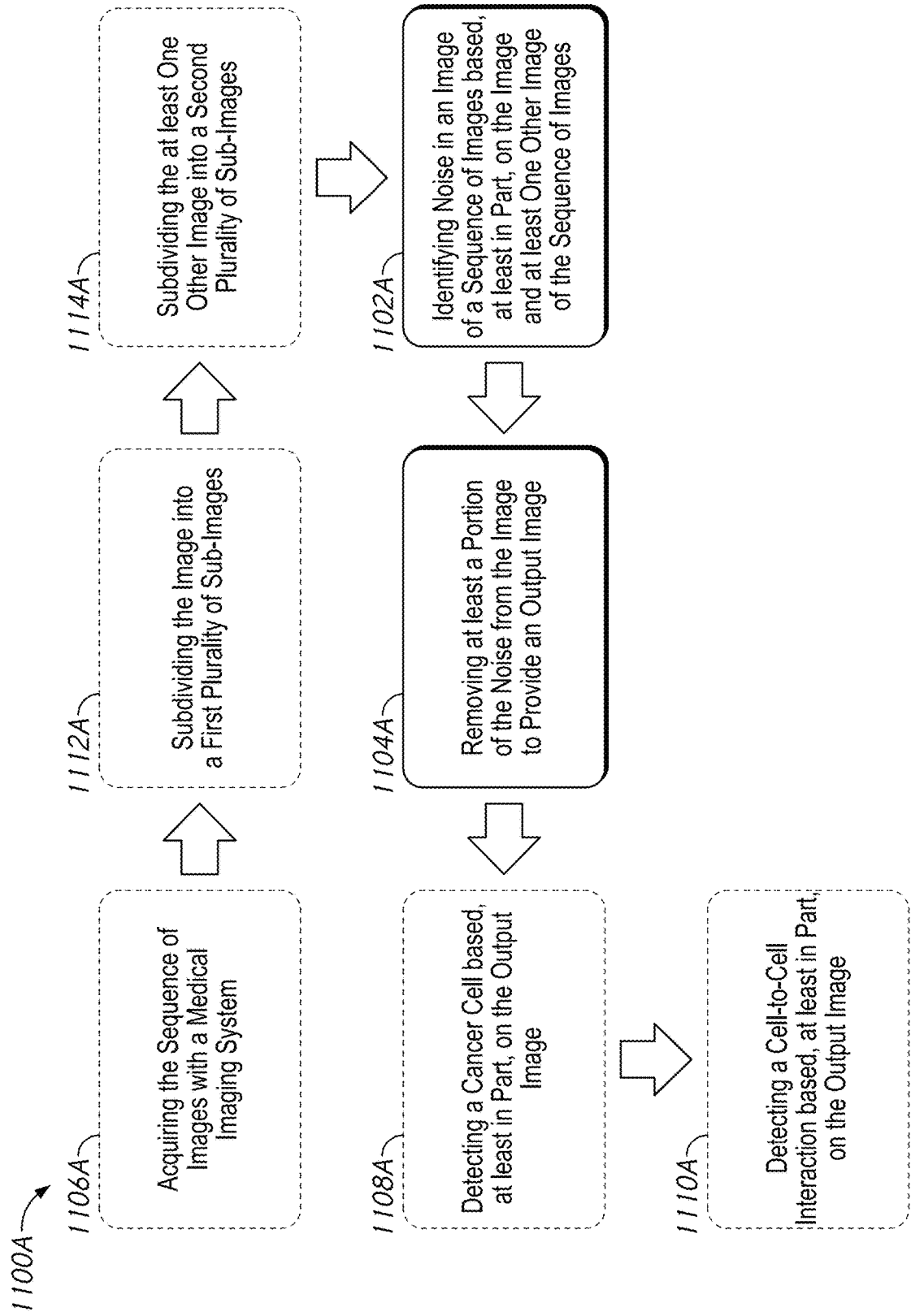
FIG. 11A is a flow chart of a method in accordance with examples of the present disclosure.

FIG. 11A is a flow chart of a method in accordance with examples of the present disclosure. Method 1100A may be a method for denoising an image (e.g., image $X_i$, image $X_j$), for example, an FIB-SEM, CT, and/or MRI image. The image may be an image of a sequence, such as a temporal and/or spatial sequence. In some examples, the method may be performed at least in part, by a machine learning model, such as machine learning model 202, machine learning model 500, and/or machine learning model 700. In some examples, the method 900A may be performed at least in part by one or more building units, such as building units 510, 600, 710, 800, and/or 802. In some examples, the machine learning model and/or building units may be implemented by a computing system, such as computing system 400. In some examples, the method 1100A may be implemented by a computing system, such as computing system 400. For example, the computing system may include a non-transitory computer readable medium encoded with instructions that when executed by a processor of the computing system, perform method 1100A.

At block 1102A, "identifying noise in an image of a sequence of images based, at least in part, on the image and at least one other image of the sequence of images" may be performed. In some examples, identifying noise may include estimating and/or predicting the noise in the image. In some examples, the image and the at least one other image may be spatially distinct, temporally distinct, or a combination thereof. At block 904A, "removing at least a portion of the noise from the image to provide an output image" may be performed. The output image may correspond to the image of the sequence with the portion of noise removed (e.g., a denoised image). In some examples, the identifying and removing are performed, at least in part, by a machine learning model. In some examples, the machine learning model is implemented by at least one processor, such as processor 402. In some examples, the machine learning model may include an RNN, such as machine learning model 500 and machine learning model 700.

Optionally, in some examples, at block 1106A "acquiring the sequence of images with a medical imaging system" may be performed. For example, medical imaging system 422 may be used to acquire the sequence of images. In some examples, the medical imaging system may include a FIB-SEM, an MRI, a CT, and/or an ultrasound imaging system. In some examples, the sequence of images may include a plurality of image planes acquired from a volume of a biological sample.

Optionally, in some examples, at block 1108A, "detecting a cancer cell based, at least in part, on the output image" may be performed. Optionally, in some examples, at block 1110A, "detecting a cell-to-cell interaction based, at least in part, on the output image" may be performed. In some examples, the detection may be performed by another machine learning model trained to detect when the cancer cells and/or cell-to-cell interactions are present in output images (e.g., denoised images) provided by a machine learning model implementing blocks 1102A and/or 1104A. In some examples, the detection may be performed by one or more image processing techniques (e.g., segmentation, histogram analysis) applied to the denoised images.

Optionally, when hardware and/or a computing system, such as computing system 400 cannot process entire images at once, blocks 1112-1114A may be performed. At block 1112A, "subdividing the image into a first plurality of sub-images" may be performed. At block 1114A, "subdividing the at least one other image into a second plurality of sub-images" may be performed." In these examples, blocks 1102A and 1104A may be performed on the first plurality of sub-images and the second plurality of sub-images to generate a plurality of output sub-images and reconstructing the plurality of output sub-images to provide the output image may be performed.

Figure 11B:
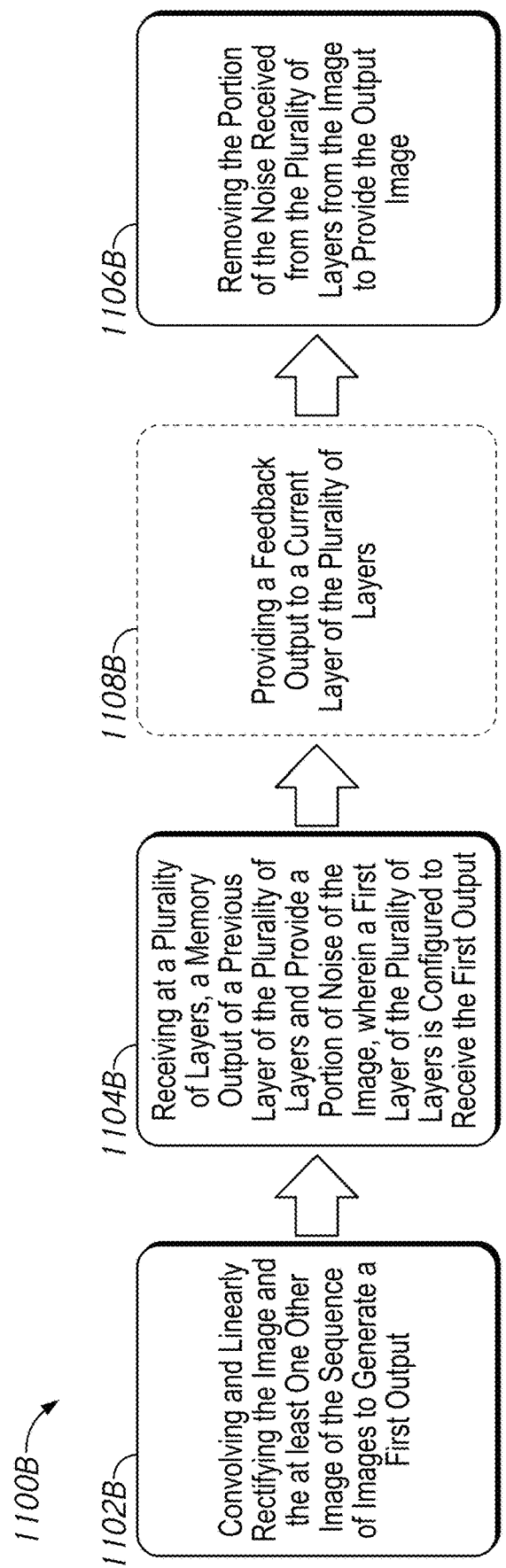
FIG. 11B is a flow chart of an implementation of the identifying and removing shown in FIG. 11A in accordance with examples of the present disclosure.

FIG. 11B is a flow chart of an implementation of the identifying and removing shown in FIG. 11A in accordance with examples of the present disclosure. The method 1100B may be used to implement the identifying and removing blocks 1102A and 1104A shown in FIG. 11A in some examples. At block 1102B, "convolving and linearly rectifying the image and the at least one other image of the sequence of images to generate a first output" may be performed. In some examples, this may be performed by a ConvReLU layer, such as ConvReLU layer 508.

At block 1104B, "receiving at a plurality of layers, a memory output of a previous layer of the plurality of layers and provide a portion of noise of the image, wherein a first layer of the plurality of layers is configured to receive the first output." In some examples, the plurality of layers may include one or more building units, such as building units 510 and/or building unit 600. In some examples, the portion of noise may be provided by a noise attention block, such as noise attention block 512, 532, and/or 612, and/or 900.

At block 1106B, "removing the portion of the noise received from the plurality of layers from the image to provide the output image" may be performed. In some examples, the removing may be performed by an adder block, such as adder block 514, 534, and/or 614.

In some examples, method 1100B includes block 1108B, at which "providing a feedback output to a current layer of the plurality of layers" may be performed. In some examples, the feedback may be based, at least in part, on the memory output of the previous layer of the plurality of layers and the image with the portion of the noise provided by the previous layer of the plurality of layers removed. In some examples, the feedback may be provided by a feedback block such as feedback block 516, 530, and/or 1000. Although block 1108B is shown between block 1104B and 1106B, in some examples, all or a portion of block 1108B may be performed concurrently with block 1104B and/or 1106B.

Figure 11C:
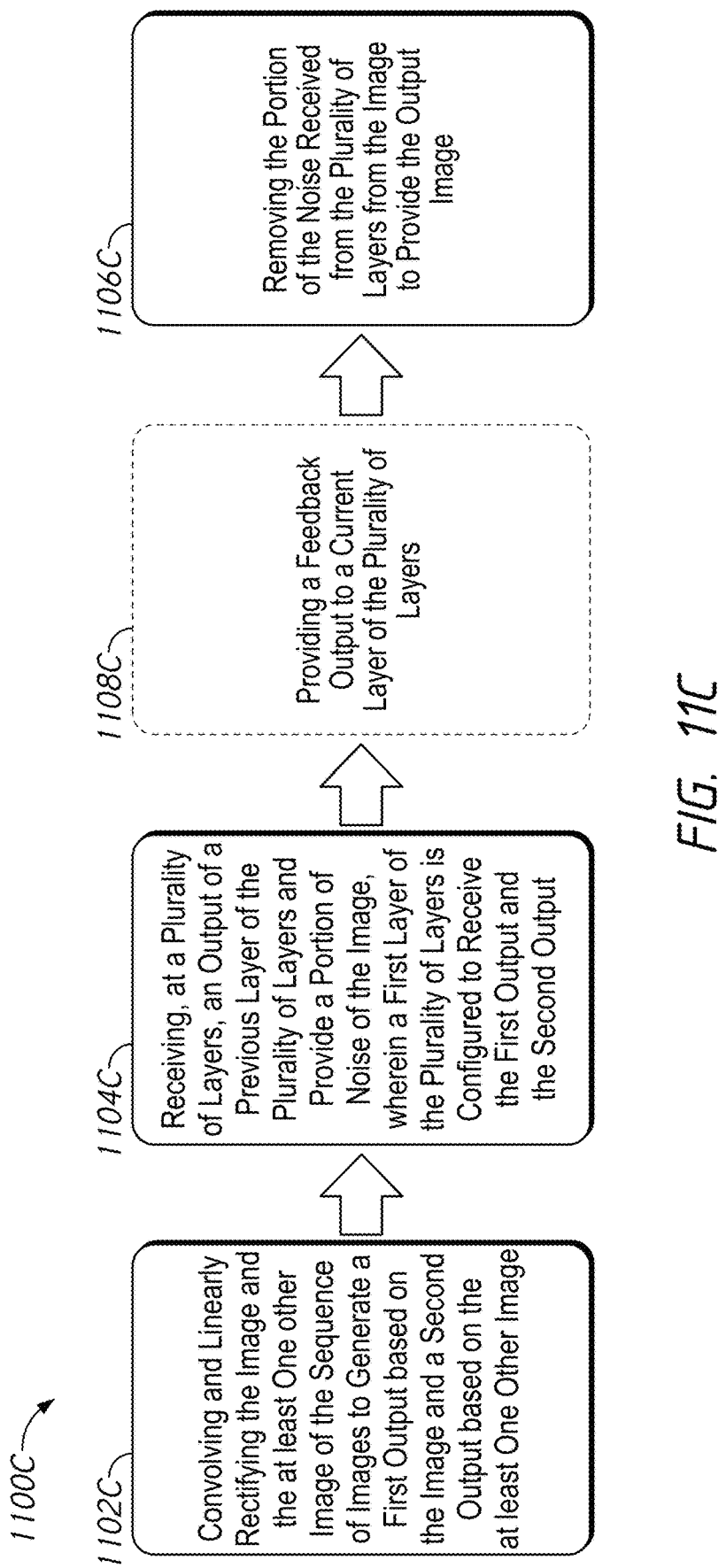
FIG. 11C is a flow chart of an implementation of the identifying and removing shown in FIG. 11A in accordance with examples of the present disclosure.

FIG. 11C is a flow chart of an implementation of the identifying and removing shown in FIG. 11A in accordance with examples of the present disclosure. The method 1100C may be used to implement the identifying and removing blocks 1102A and 1104A shown in FIG. 11A in some examples. At block 1102C, "convolving and linearly rectifying the image and the at least one other image of the sequence of images to generate a first output based on the image and a second output based on the at least one other image" may be performed. In some examples, block 1102C may be performed by a ConvReLU layer, such as ConvReLU layer 708.

At block 1104C, "receiving, at a plurality of layers, an output of a previous layer of the plurality of layers and provide a portion of noise of the image, wherein a first layer of the plurality of layers is configured to receive the first output and the second output" may be performed. In some examples, the plurality of layers may include one or more building units, such as building units 710, building unit 800, and/or building unit 802. In some examples, the portion of noise may be provided by a noise attention block, such as noise attention block 712, 732, and/or 900.

At block 1106C, "removing the portion of the noise received from the plurality of layers from the image to provide the output image" may be performed. In some examples, the removing may be performed by an adder block, such as adder block 714 and/or 734.

In some examples, method 1100C includes block 1108C, at which "providing a feedback output to a current layer of the plurality of layers" may be performed. In some examples, the feedback may be based, at least in part, on the first and/or second output of the previous layer of the plurality of layers and the image with the portion of the noise provided by the previous layer of the plurality of layers removed. In some examples, the feedback may be provided by a feedback block such as feedback block 716, 730, and/or 1000. Although block 1108C is shown between block 1104C and 1106C, in some examples, all or a portion of block 1108C may be performed concurrently with block 1104C and/or 1106C.

Figure 11D:
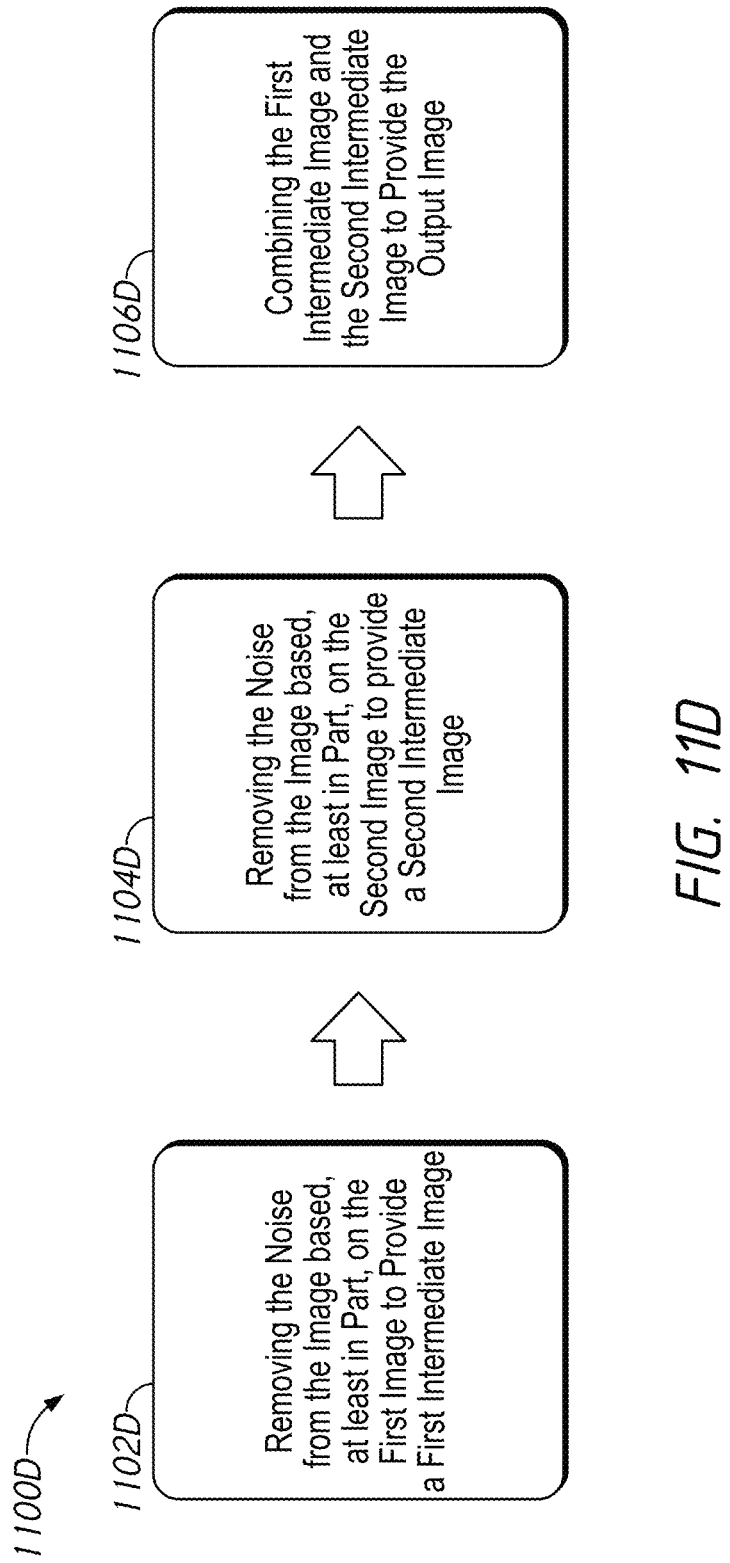
FIG. 11D is a flow chart of an implementation of the identifying and removing shown in FIG. 11A in accordance with examples of the present disclosure.

FIG. 11D is a flow chart of an implementation of the identifying and removing shown in FIG. 11A in accordance with examples of the present disclosure. In some examples, the at least one other image of the sequence of images may include a first image and a second image (e.g., $X_{i-1}$ and $X_{i+1}$). The method 1100D may be used to implement the identifying and removing blocks 1102A and 1104A shown in FIG. 11A in some examples.

At block 1102D, "removing the noise from the image based, at least in part, on the first image to provide a first intermediate image" may be performed. In some examples, the removing may be performed by a branch of a machine learning model, such as branch 502 or 504, or branch 702 or 704. At block 1104D, "removing the noise from the image based, at least in part, on the second image to provide a second intermediate image" may be performed. In some examples, the removing may be performed by another branch of the machine learning model, such as the other of branch 502 or 504 or 702 or 704. At block 1106D, "combining the first intermediate image and the second intermediate image to provide the output image" may be performed. In some examples, combining may include taking an average of the two intermediate images.

As described with reference to FIGS. 1A, 1B, and 2, a machine learning model is trained to perform a desired task prior to being deployed on "real data." During training, acceptable parameters (e.g., network coefficients) of the machine learning model are determined based on the accuracy of predictions/inferences (e.g., identification of noise) made by the machine learning model with the parameters. Parameters may include values for weights of matrices and/or vectors. The accuracy of predictions may be represented by a loss function. The value of the loss function may be high when the machine learning model makes poor predictions (e.g., inaccurately identifies noise in an image) and may be lower when the machine learning model makes good predictions (e.g., more accurately identifies noise in the image). The machine learning model may be considered "trained" when the loss function reaches a minimum value (e.g., the loss function is minimized). The parameters of the machine learning model that provide the minimum value of the loss function may be used with the machine learning model when it is deployed on non-training data (e.g., new data). In some examples, the training may be performed, at least in part, by an optimizer. An example of a suitable optimizer is an ADAM optimizer. However, other optimizers may be used.

Figure 12:
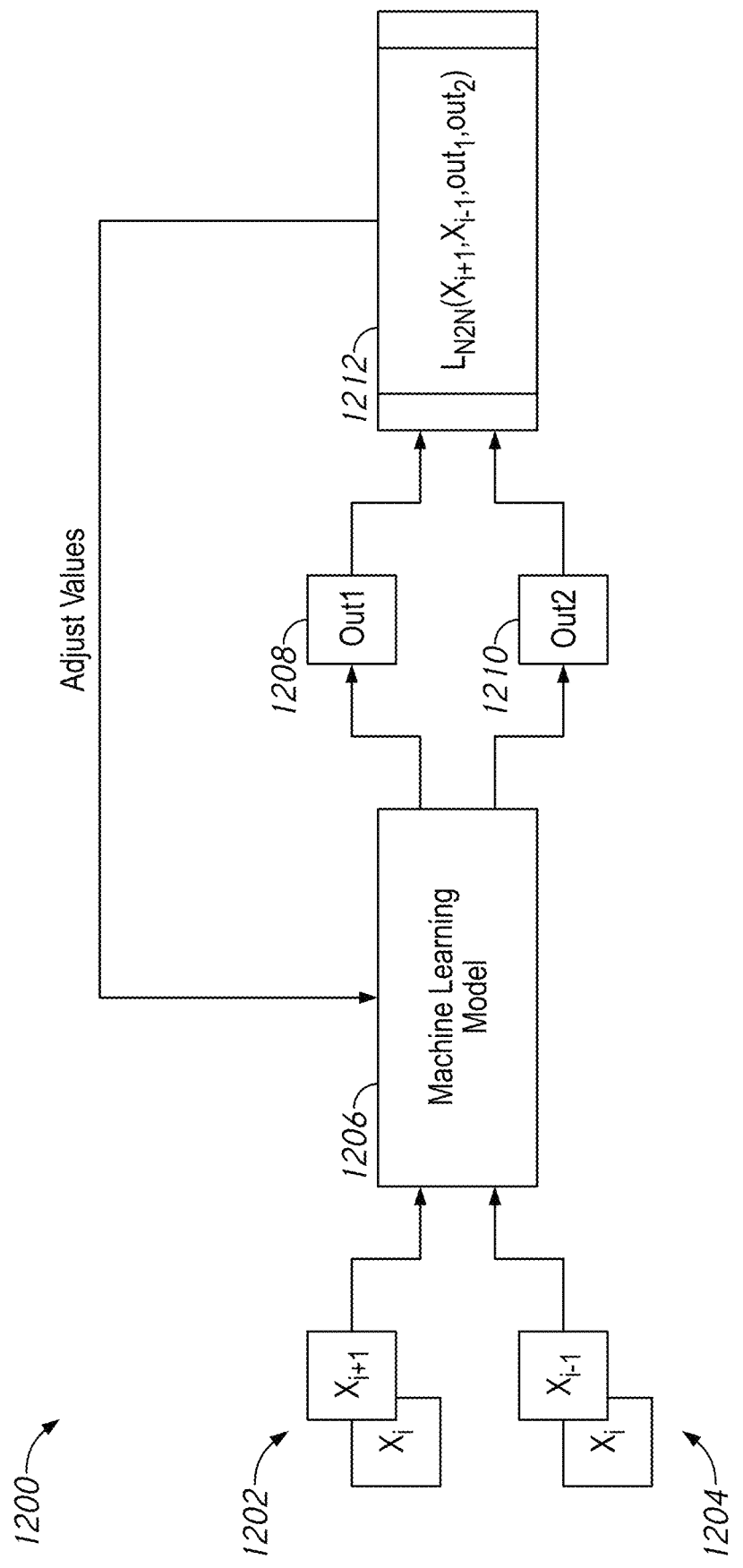
FIG. 12 is a diagram illustrating a process of training of a machine learning model to denoise an image in accordance with examples of the present disclosure.

FIG. 12 is a diagram illustrating a process of training of a machine learning model to denoise an image in accordance with examples of the present disclosure. In some examples, the process 1200 may be performed by a computing system, such as computing system 400. In some examples, an optimizer may perform some or all of the process 1200. In some examples, the optimizer may be implemented by the computing system. The machine learning model and/or optimizer may be implemented by the computing system by executing (e.g., by processor 402) instructions stored on a computer-readable medium, such as executable instructions 408, and/or by hardware (e.g., logic circuits, ASIC, and/or FPGA). Sets of training images 1202, 1204 may be provided as inputs to a machine learning model 1206. For example, by providing the images to 1202, 1204 to computer readable medium 404 and/or memory 412. In some examples, the machine learning model 1206 may include machine learning model 202, 500 and/or 700. In some examples, the sets of training images 1202, 1204 are pairs of images from a sequence of images. In some examples, one or more images from the sequence is common to both sets 1202, 1204. In the example shown in FIG. 12, set 1202 includes an image $X_i$ and an image $X_{i+1}$ and the set of training images 1204 includes the image $X_i$ and an image $X_{i-1}$. In some examples, set 1202 may be provided to one branch of the machine learning model (e.g., branch 502, 702) and set 1204 may be provided to another branch of the machine learning model (e.g., branch 504, 704).

Initially for training, the weights for feature matrices and/or other network coefficients of the machine learning model 1206 (e.g., values for weights of $W_u$, $V_u$, $W_r$, $V_r$, $W_c$, and/or $V_c$) may be set to initial values. These values may be stored in computer readable medium 404 and/or memory 412 in some examples. Based, at least in part, on the sets 1202, 1204 and the initial values, the machine learning model 1206 may provide two output images 1208, 1210. In some examples, output image 1208 (e.g., image $X_i'$ 520, image $X_j'$ 720) may be based, at least in part, on set 1202 and output image 1210 (e.g., image $X_i''$ 522, image $X_j''$ 722) may be based, at least in part, on set 1204. The output images may be analyzed by a loss function 1212. Based, at least in part, on a value of the loss function, one or more of the values of the machine learning model 1206 may be adjusted. The process 1200 may be performed repeatedly (e.g., process 1200 is iterative) until a minimum value of the loss function 1212 is reached.

Expanding on the process 1200, in some examples, a machine learning model may be trained with three consecutive images $x_{k,i-1}$, $x_{k,i}$, $x_{k,i+1}$ of a sequence of images for k=1 . . . N, grouped into two pairs ($x_{k,i}$, $x_{k,i-1}$) and ($x_{k,i}$, $x_{k,i+1}$). Both pairs may be fed-forward through the machine learning model, as illustrated by sets 1202, 1204, and two denoised images $out_{k,i-1}$ and $out_{k,i+1}$ (e.g., images 1208 and 1210) for k=1 . . . N, where N is equal to the number of sequences of images. The loss function L may include two main terms: a noise-to-noise term and regularizer as shown below:

$$L = L_{n2n} + \omega_R L_R \quad \text{Equation 13}$$

Where $L_{n2n}$ is provided by:

$$L_{n2n} = \frac{1}{N}\sum_{k=1}^{N} L(x_{k,i+1}, x_{k,i-1}, out_{k,i+1}, out_{k,i-1}) \quad \text{Equation 14}$$

where $$L(x_{i+1}, x_{i-1}, out_{i+1}, out_{i-1}) = \quad \text{Equation 15}$$

$$\left\{\frac{1}{2}\|out_{i-1} - x_{i+1}\|_2^2 + \frac{1}{2}\|out_{i+1} - x_{i-1}\|_2^2 - \frac{1}{4}\|out_{i-1} - out_{i+1}\|_2^2\right\}$$

$$L_{n2n} = \frac{1}{N \times M}\sum_{k=1}^{N \times M}\left\{\frac{1}{2}\|out_{k,i-1} - x_{k,i+1}\|_2^2 + \right. \quad \text{Equation 16}$$

$$\left.\frac{1}{2}\|out_{k,i+1} - x_{k,i-1}\|_2^2 - \frac{1}{4}\|out_{k,i-1} - out_{k,i+1}\|_2^2\right\}$$

Where N is a number of samples and M is a number of images acquired from each sample.

The regularizer term $\omega_R L_R$ may be an L2 norm weight decay term on network coefficients in some examples. However, in other examples, a regularizer term need not be used in the loss function L:

$$L = L_{n2n} \quad \text{Equation 17}$$

Where $L_{n2n}$ is as provided in Equations 14-16.

The loss function provided in Equations 13-17 may be used due, at least in part, to the spatial and/or temporal independence of the noise in each image of the sequence of images. In some examples, every image in the sequence may be considered discrete versions of the signal along another dimension (e.g., if each image extends in an x-y plane of a volume, the other dimension may be along the z-axis of the volume). Thus, for every image of the sequence can be viewed as:

$$x_{i\pm1} = s_i + n + e_0 \quad \text{Equation 18}$$

Where $s_i$ is the "real" signal of the image $x_i$, n is the noise in image $x_i$, and $e_0$ is the error. The error $e_0$ may be due, at least in part, to the spatial and/or temporal difference between image $x_i$ and image $x_{i-1}$ and $x_{i+1}$. However, the error may be given as:

$$e_0 = O(s_{i\pm1} - s_i) \quad \text{Equation 19}$$

Thus, the error is small enough that the Taylor expansion along the other dimension (e.g., z dimension) may be used for the loss function as shown in Equations 15-16.

Figure 13:
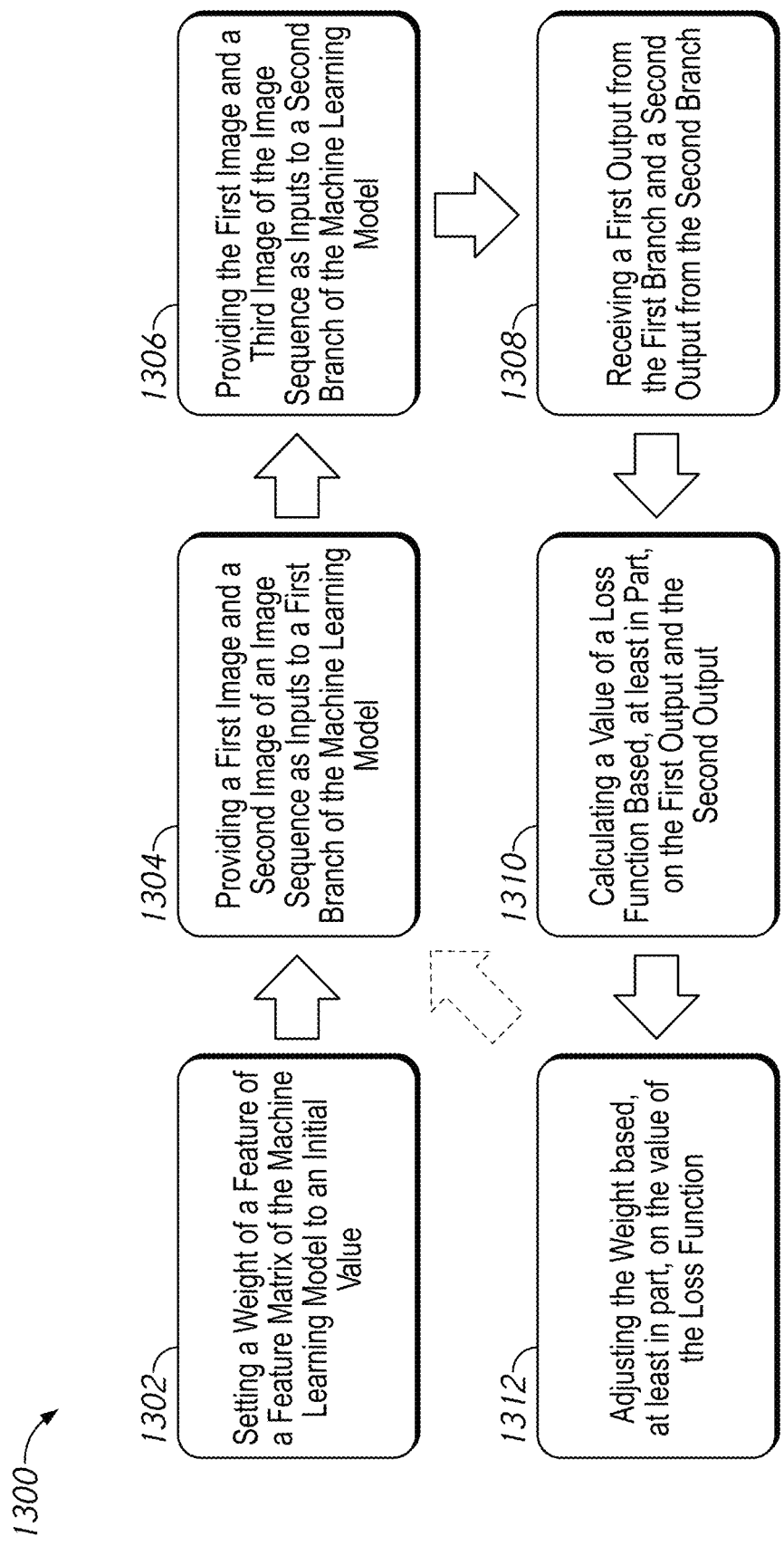
FIG. 13 is a flow chart of a method for training a machine learning model to denoise an image in accordance with examples of the present disclosure.

FIG. 13 is a flow chart of a method for training a machine learning model to denoise an image in accordance with examples of the present disclosure. The method 1300 may be used to train machine learning model 202, 500, 700, and/or 1206 in some examples. In some examples, the method 1300 may be performed in whole or in part by a computing system, such as computing system 400. For example, the computing system may include a non-transitory computer readable medium encoded with instructions that when executed by a processor of the computing system, perform the method 1300. In some examples, the computing system may implement an ADAM optimizer to perform some or all of the method 1300.

At block 1302, "setting a weight of a feature of a feature matrix of the machine learning model to an initial value" may be performed. For example, one or more values for weights for convolutional blocks 640 and/or 658 and/or convolutional layers, such as ConvReLU layer 508, 708, 718 and/or ReLUConv layer 518 may be set to an initial value. These values may be stored in a non-transitory computer readable medium (e.g., computer readable medium 404) and/or a memory (e.g., memory 412).

At block 1304, "providing a first image and a second image of an image sequence as inputs to a first branch of the machine learning model" may be performed. At block 1306, "providing the first image and a third image of the image sequence as inputs to a second branch of the machine learning model" may be performed. In some examples, the first, second, and third images include noise. The noise may be random and/or independent in some examples. In some examples, the noise may come from multiple sources (e.g., thermal, beam irregularities, etc.). In some examples, the first image and the second image are consecutive images of the image sequence and the first image and the third image are consecutive images of the image sequence. In some examples, the images may be of biological cells or other biological material. In some examples, the images may be FIB-SEM images. In some examples, the images may have been acquired by a medical imaging system, such as imaging system 422. The images may be provided to the machine learning model by providing the images directly to one or more processors implementing the machine learning model (e.g., processor(s) 402) or by providing the images to a computer readable medium (e.g., computer readable medium 404) and/or a memory (e.g., memory 412).

At block 1308, "receiving a first output from the first branch and a second output from the second branch" may be performed. At block 1310, "calculating a value of a loss function based, at least in part, on the first output and the second output." In some examples, the calculations may be performed by the processor of the computing system. In some examples, the loss function may include a noise-to-noise term. In some examples, the loss function may include a regularizer term. In some examples, the noise-to-noise term may be based, at least in part, on a term including a difference of the second image and the second output, a term including a difference of the third image and the first output, and a term including a difference of the first output and the second output. In some examples, the noise-to-noise term includes a function including a weighted sum of the terms. In some examples, at least two of the terms are weighted equally. In some examples, at least one of the weights is negative. In some examples, the noise-to-noise term includes an average of the function. In some examples, the regularizer term includes an L2 norm weight decay term. In some examples, the loss function provided in Equations 13-17 may be used.

At block 1312, "adjusting the weight based, at least in part, on the value of the loss function" may be performed. In some examples, blocks 1302-1312 may be performed iteratively until the value of the loss function reaches a minimum value. Adjusting the weights may include writing or rewriting the values of the weights in the computer readable medium and/or memory.

Once the machine learning model has been trained, it may be used to make inferences, estimates and/or predictions, such as identifying noise in an image of a sequence. For example, machine learning model 202 shown in FIG. 2, machine learning model 500, and/or machine learning model 700 may be a trained model. The identified noise may then be removed from the image to provide a clean (e.g., less noisy) image. Ideally, the machine learning model would be trained each time a new set of images to be analyzed is provided. Given the number of images required to train the machine learning model, this may not be feasible. However, good results may be achieved by using a machine learning model trained on a different data set, particularly when the different data set has similar characteristics to the new data set, such as acquired by the same imaging modality, same imaging system, imaging parameters, and/or when the different data set includes images containing the same subject matter (e.g., breast cells) as the new data set. For example, a machine learning model may be trained and used to denoise images from a single imaging system (e.g., a particular FIB-SEM system). In another example, the machine learning model may be trained and used to denoise images from different imaging systems from the same modality (e.g., multiple MRI machines). Additionally or alternatively, when the new data set has similar characteristics to the different data set, the trained machine learning model may be used as a starting point (e.g., use network coefficients for the trained model as the initial values) for training. By using the trained model as a starting point, the machine learning model may require less training than typically required.

An example implementation of a machine learning model and results will now be described. The example is provided merely for exemplary purposes and the disclosure is not limited to the provided example. In the following example, the machine learning model includes a two-branched architecture, each with an RNN, as shown in FIG. 5 and in FIG. 7. The machine learning model was as implemented using three to five building units for each branch. The machine learning model according to the example is referred to as a Noise Reconstruction and Removal Network (NRRN).

The NRRN was trained to denoise images obtained with FIB-SEM using images acquired by Oregon Health & Science University (OHSU). The OHSU data set includes images of specimens taken from cancerous tissues. The data set contained five volume data files converted to a sequence often images per volume. Images were 4K×6K pixels in size. The OHSU dataset included noisy images and also ground truth (longer exposure) images.

To analyze the quality of denosing techniques, two classical measures were used: the Peak signal-to-noise (PSNR) and the Structural Similarity index (SSIM). Both of these measures compare the denoised image to a ground truth image. However, for FIB-SEM, real ground truth images are not available. In the case of OHSU data set, an average of ten sample scans were obtained before slicing the specimen with the FIB-SEM to approximate a ground truth image.

In the case of FIB-SEM, the flow from tissue collection to final image harvesting takes roughly two weeks. During that process the clinical specimen undertakes several resin infiltrations where the space between the cellular components is filled with resin. To analyze the NRRN, noise presence in the resin was evaluated. A good quality denoising technique should remove the majority of the noise in the resin. A flat signal at the resin regions should be observed. To quantify this property, the interquartile range (IQR) of the signal across a straight line in the resin area was acquired. A smaller IQR indicates small variability of the signal across the resin. Simultaneously, the edges of the cellular components should be preserved. In other words, high PSNR, SSIM close to 1, small IQR in the resin, and sharp edges on the cellular components are observed when a denoising technique is successful. Note that this type of analysis is only applicable to images of resin embedded specimens. Other analysis methods may be used for different image types and/or imaging modalities.

NRRNs having the architectures and components described with reference to FIGS. 5-10 were trained to denoise images based on the process described with reference to FIGS. 12-13 with the OHSU FIB-SEM data set. As noted previously, the FIB-SEM images are of significant size—4K×6K. The initial large images were patched into 256×256 pixels images, obtaining a training set of 8190 images and 2730 testing set and additional 4095 images for validation. In addition, the images were converted to YCbCr, and only the Y channel was used. The architecture was implemented in PyTorch. Training was performed with an ADAM optimizer with an initial learning rate $10^{-4}$, $\beta 1=0.9$, $\beta 2=0.999$ and $\in=10^{-8}$. In the example using the machine learning model shown in FIGS. 5 and 6, the NRRN achieved, on the validation data set, a PSNR of 31.0110±0.1718 dB and SSIM 0.9703±0.0006. In the example using the machine learning model shown in FIGS. 7 and 8, the NRRN achieved PSNR of 31.0197±0.1905 dB and a SSIM of 0.9705±0.0006.

Figure 14:
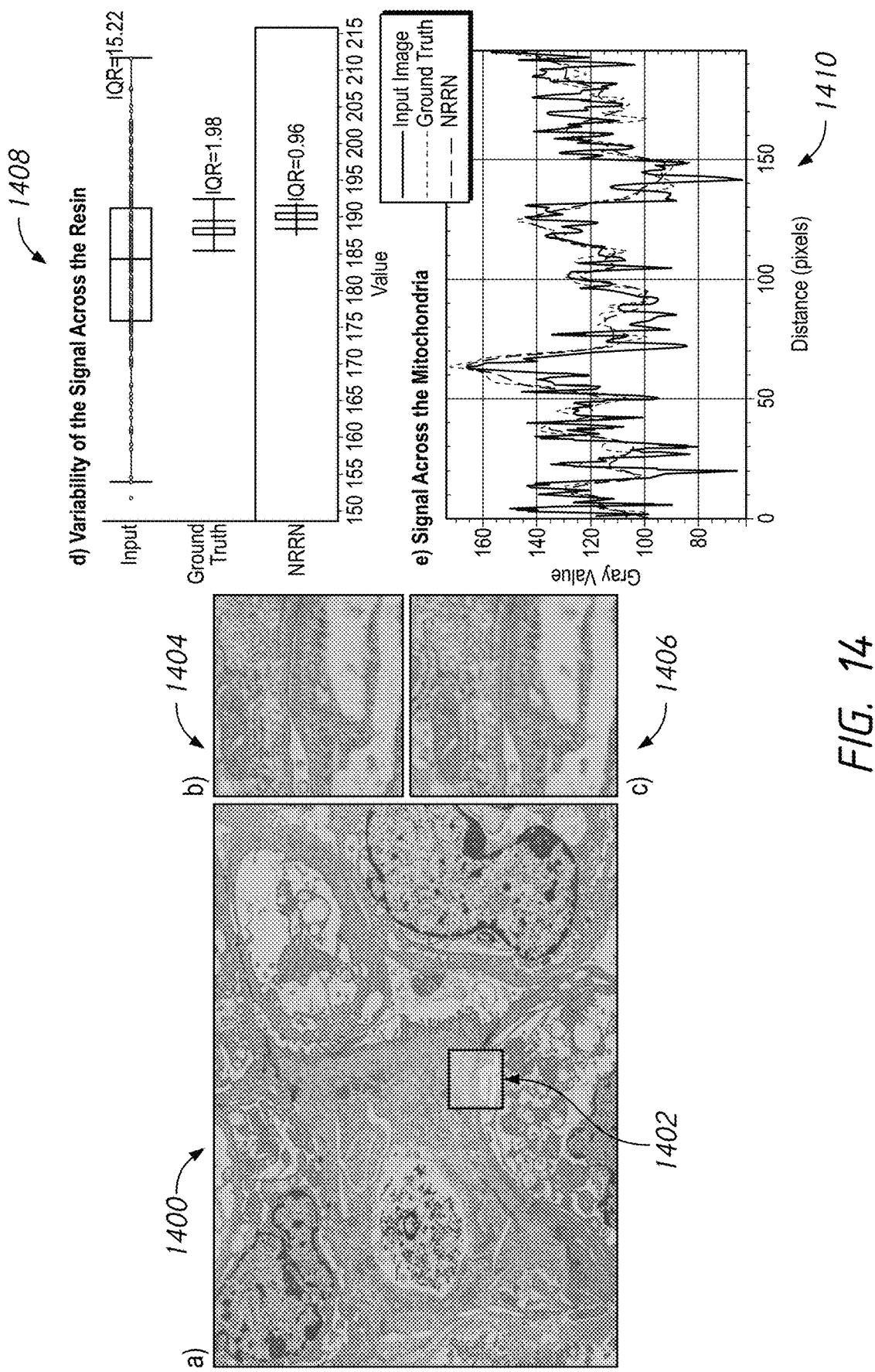
FIG. 14 shows example images from the validation volume in accordance with examples of the present disclosure.

FIG. 14 shows example images from the validation volume in accordance with examples of the present disclosure. Image 1400 is an FIB-SEM of cancerous tissue. Image 1404 is an enlargement of the portion of image 1400 indicated by box 1402. Image 1406 is an enlargement of the portion of image 1400 indicated by box 1402. However, in contrast with image 1404, the NRRN according the machine learning model shown in FIGS. 5-6 was applied to denoise the image 1400. Plot 1408 illustrates the variability of the image signal across the resin within the sample. The plot 1408 shows that the NRRN achieved a PSNR of 31.09 dB, which is indicative of a significant reduction of the noise on the resin and the IQR is reduced to 0.96. Plot 1410 illustrates the image signal across the mitochondria. The plot 1410 illustrates that the in addition to removing noise, the NRRN preserved sharp edges at the cell organelle boundaries.

The NRRN was trained on pairs of three images, and inference (e.g., identification of noise) is based on three images provides adequate denoising, as noted previously, two or even one image may be used to make an inference. While more images typically provide higher PSNR and SSIM lower noise level across the resin, inference with two input images gives very satisfactory quality as well (e.g., less than 2% worse than the three images input).

The NRRN was compared to other denoising techniques including non-local means (NLM) which is a non-training technique currently considered the "gold standard" for denoising EM images. NRRN was also compared to other machine learning models including U-Net and DenoiseNet, in particular, the DenoiseNet described in Tal Remez, Or Litany, Raja Giryes, and Alex M. Bronstein. Class-Aware Fully Convolutional Gaussian and Poisson Denoising. *IEEE Transactions on Image Processing*, 27(11):5707-5722, November 2018.

The images coming from FIB-EM are large and could not be process directly on the GPU. Chunking the images to smaller patches, denoising the smaller images (e.g., subimages) and putting them back to recreate the original whole image was performed. In order to denoise an image coming from FIB-EM, a 4K×6K image was chunked (e.g., subdivided) into 346 smaller overlapping patches of size 256× 256 pixels. The overlap was set to 20 pixels in every direction to avoid borders artifacts.

Networks like U-Net, which attempt to reconstruct the image, are not able to use their strength since these networks do not "see" the whole image when it is subdivided. On the other hand, NRRN and DenoiseNet target the noise and take advantage of its random and/or independent nature. Thus, these techniques are less disadvantaged by the chunking of the images. Reconstructing and removing the noise from an image rather than reconstructing a less noisy version of the image leads to more homogeneously result across the whole image. The NRRN achieved a consistent PSNR across all the patches in contrast to U-Net.

Figure 15:
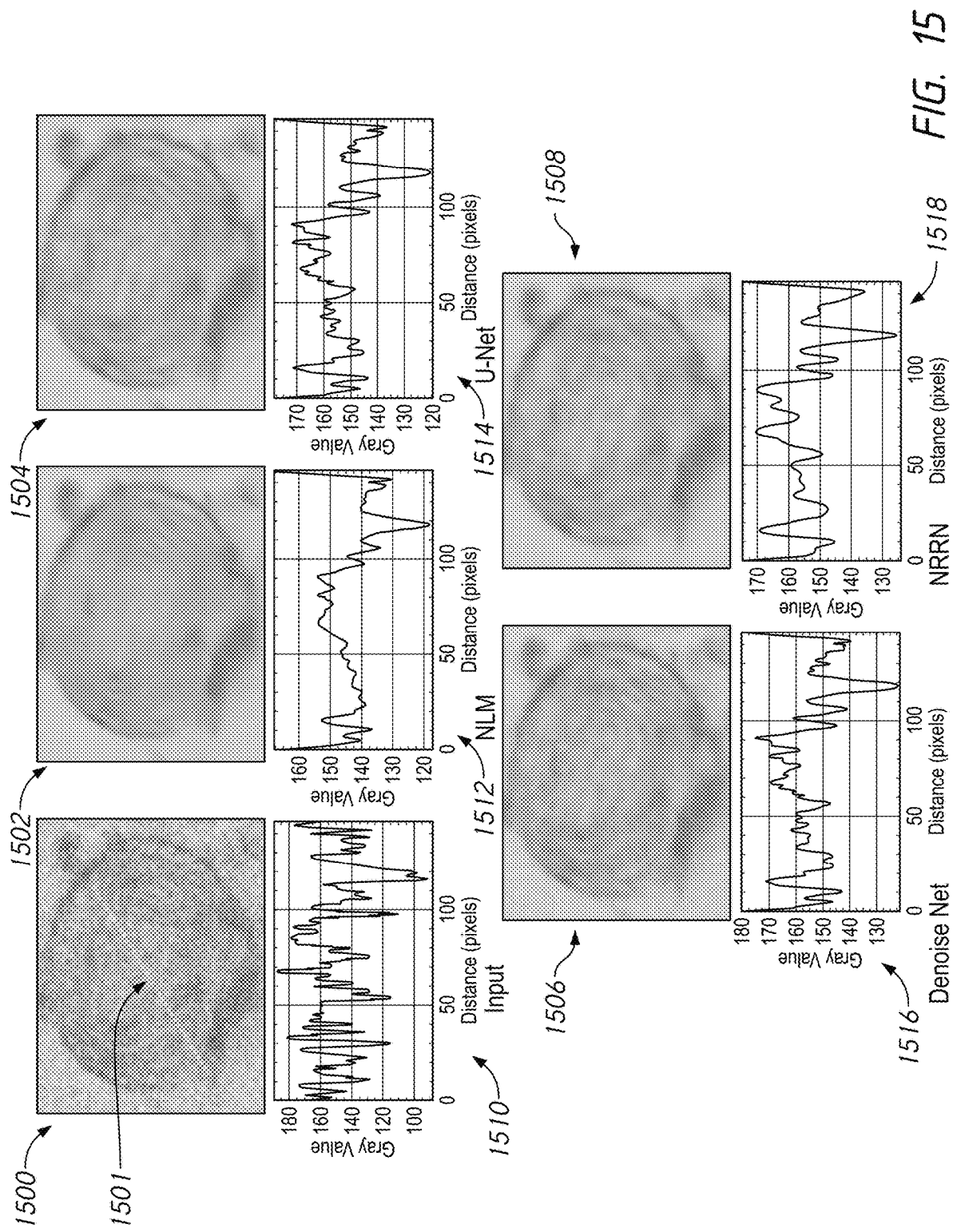
FIG. 15 shows example FIB-SEM images denoised by various techniques and corresponding noise plots.

FIG. 15 shows example FIB-SEM images denoised by various techniques and corresponding noise plots. Image 1500 is a noisy FIB-SEM image of a cell provided as an input to the various denoising techniques. Image 1502 is the image 1500 denoised using the NLM technique. Image 1504 is the image 1500 denoised using the U-Net. Image 1506 is the image using the DenoiseNet. Image 1508 is the image 1500 denoised using the NRRN of the present disclosure as shown in FIGS. 5-6. The plots 1510-1518 below each image of FIG. 15 are the plots of noise in the image along line 1501 indicated in image 1500.

The NLM, DenoiseNet, and U-Net all achieved higher PSNR and SSIM than NRRN. However, the NRRN achieved better results removing noise across the resin. Furthermore, the signal across the image structures shows that NLM and U-Net are blurring the image 1500. In some cases, the DenoiseNet images included speckling, which indicates the DenoiseNet struggles with significantly damaged/noisy images. In addition, as can be seen from a comparison of plots 1510-1518, all three methods (NLM, U-Net and DenoiseNet) show more presence of noise than NRRN.

Figure 16:
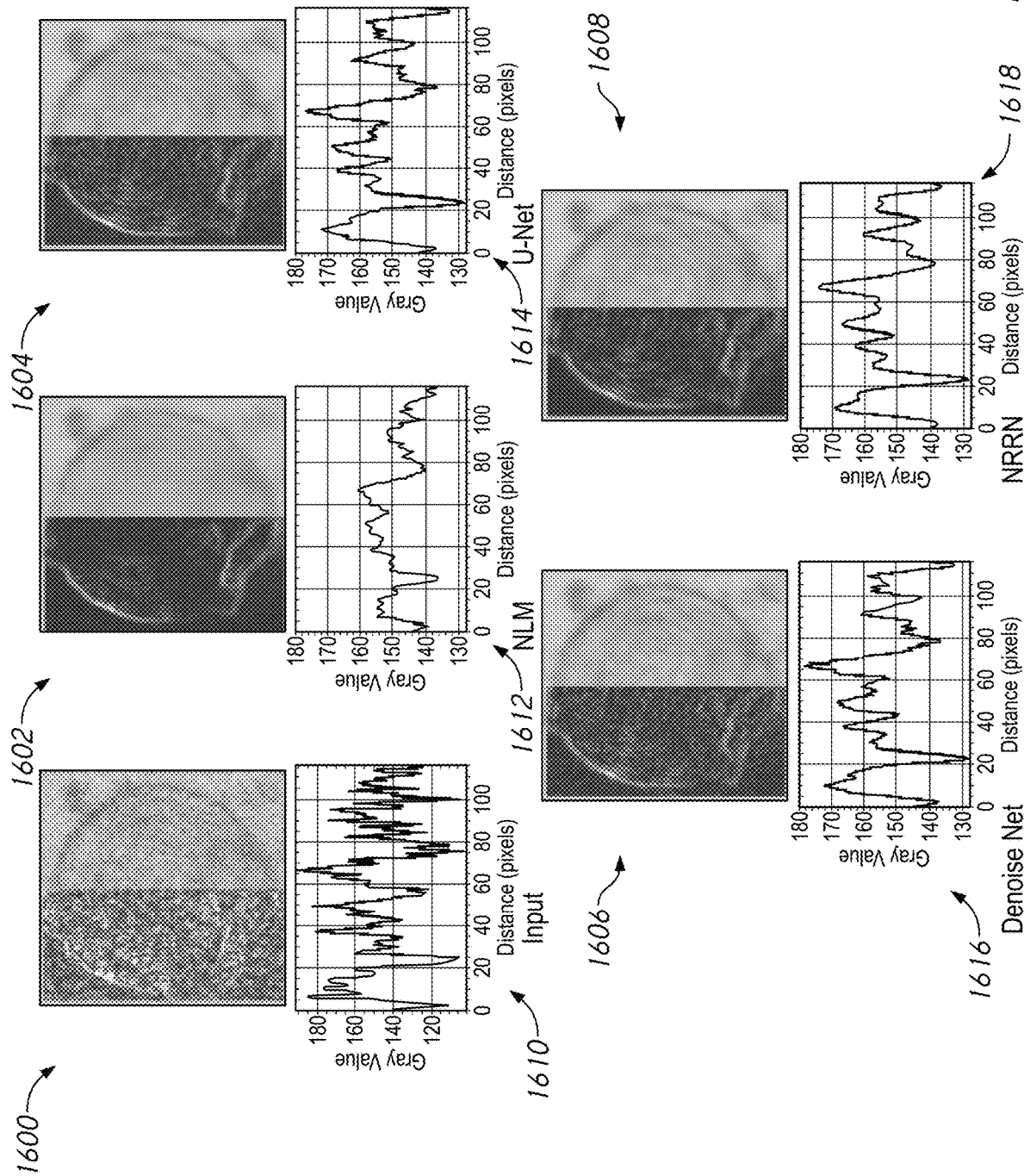
FIG. 16 shows example FIB-SEM images denoised by various techniques and corresponding noise plots.

FIG. 16 shows example FIB-SEM images denoised by various techniques and corresponding noise plots. Image 1600 is a noisy FIB-SEM image of a cell provided as an input to the various denoising techniques. Image 1602 is the image 1600 denoised using the NLM technique. Image 1604 is the image 1600 denoised using the U-Net. Image 1606 is the image using the DenoiseNet. Image 1608 is the image 1600 denoised using the NRRN of the present disclosure as shown in FIGS. 7-8. The plots 1610-1618 below each image of FIG. 16 are the plots of noise in the image along a line in image 1600.

As in FIG. 15, the NLM, DenoiseNet, and U-Net all achieved higher PSNR and SSIM than NRRN. However, the NRRN achieved better results removing noise across the resin. Furthermore, the signal across the image structures shows that NLM and U-Net are blurring the image 1600. In some cases, the DenoiseNet images included speckling, which indicates the DenoiseNet struggles with significantly damaged/noisy images. In addition, as can be seen from a comparison of plots 1610-1618, all three methods (NLM, U-Net and DenoiseNet) show more presence of noise than NRRN.

Figure 17:
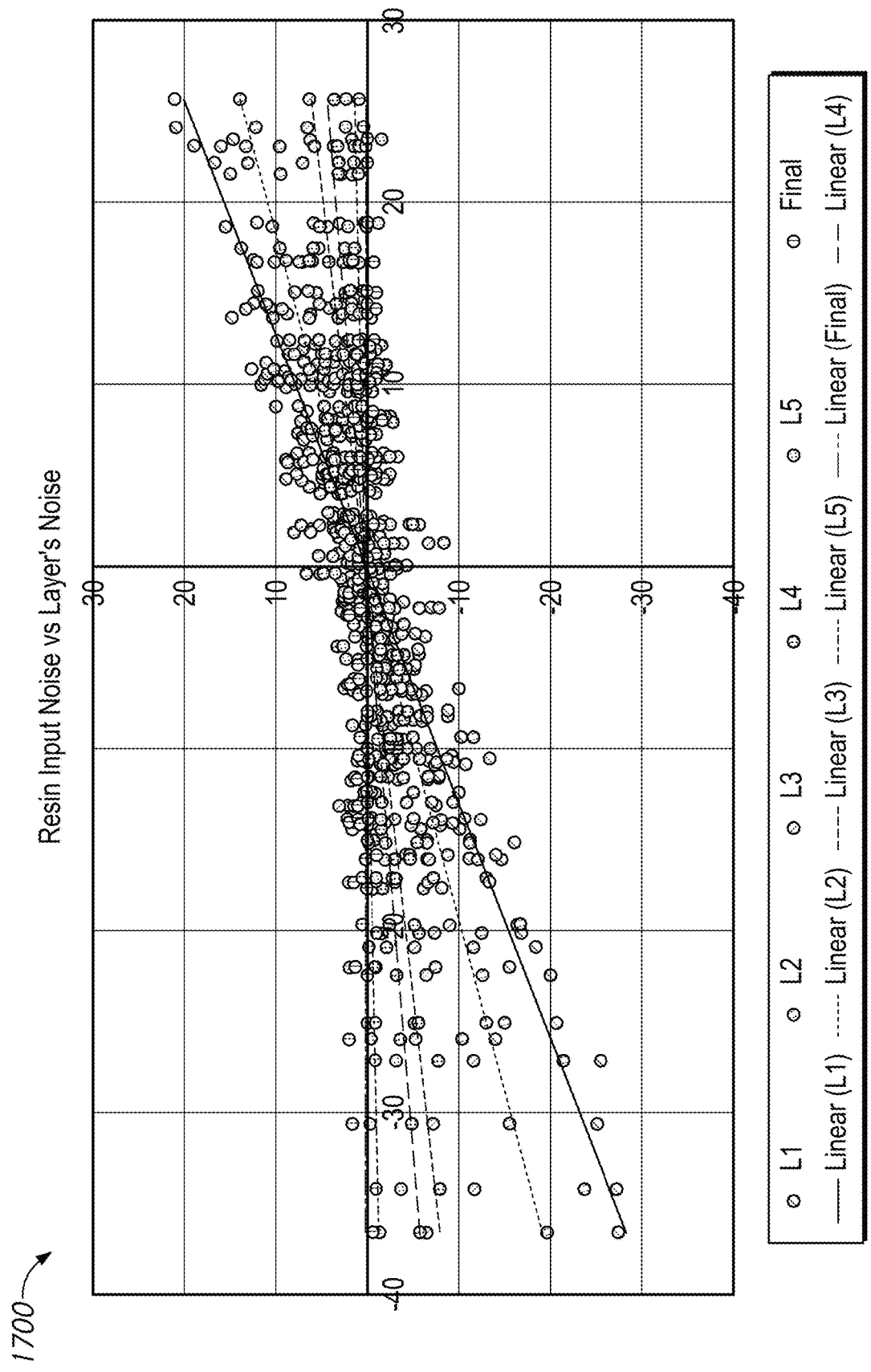
FIG. 17 shows a scatter plot of the input signal across the resin versus a layer of the machine learning model in accordance with examples of the present disclosure.

FIG. 17 shows a scatter plot of the input signal across the resin versus a layer of the machine learning model in accordance with examples of the present disclosure. The modular architecture of the NRRN (e.g., the building units) allows intermediate noise estimates at the hidden layers. The scatter plot 1700 and the layers' SSIM values indicates that a majority of the denoising may happen in the first one to three layers, after which more gradual improvement in the noise is observed. In some applications, the last two layers may be more significant in driving the SSIM up for the cases of more image corruption (e.g., higher noise), such as Poisson noise with PEAK=1 and Gaussian noise $\sigma=75$.

The ability to look at the intermediate denoising results and the modular architecture may help with the fine tuning of the machine learning model. More significant levels of noise may require more building units while for less noisy cases may require only a few building units. Thus, it may be easier to appropriately balance quality and efficiency of the machine learning model (e.g., the NRRN) compared to other denoising techniques. For example, a user and/or system designer may analyze data indicating the amount of noise removed by each layer (such as the data provided in scatter plot 1700) from different layers of the machine learning model generated from training the machine learning model on a full or partial training data set. Based on the data, the user and/or system designer may select the number of building units that provides a desired balance between noise removal and computing resources.

The apparatuses, systems, devices, and methods disclosed herein provide for the denoising of images. In some examples, a machine learning model may be trained to denoise images even when no ground truth images are available. In some examples, the machine learning model may be modular, which may provide for easier scaling of the architecture and/or comparison of performance across layers of the machine learning model. In some applications, the denoising techniques disclosed herein may be more robust than other techniques when images are divided into subimages (e.g., due to processor constraints). In some applications, the denoising techniques disclosed herein may provide reduced noise and/or reduced blurring compared to other denoising techniques.

Figure 18:
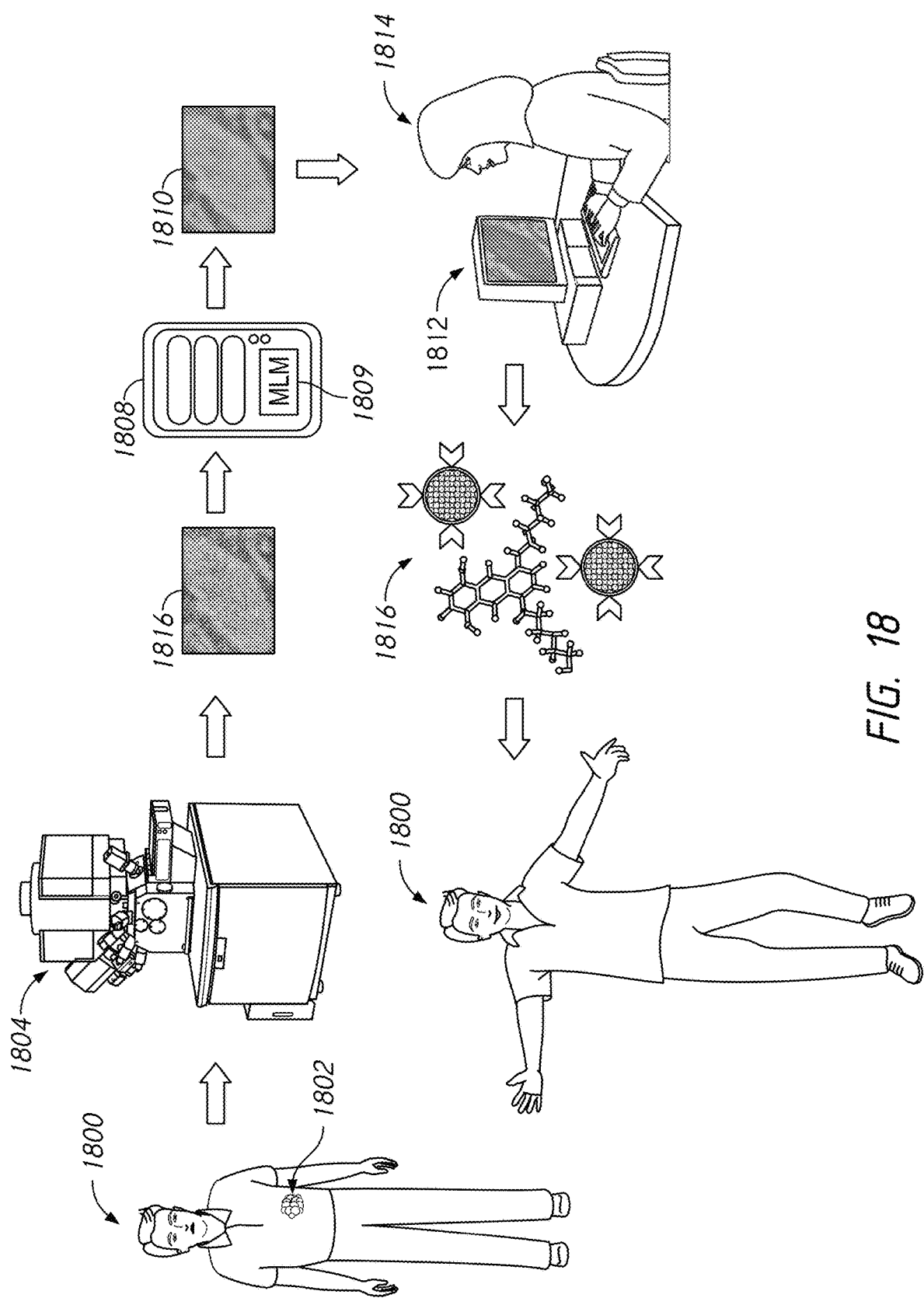
FIG. 18 illustrates an application in accordance with examples of the present disclosure.

FIG. 18 illustrates an application in accordance with examples of the present disclosure. In the example of FIG. 18, systems and/or methods arranged in accordance with examples described herein may be utilized to analyze images for the presence of a tumor. In other examples, other features may be detected in imaged denoised in accordance with systems and/or methods described herein. In the example of FIG. 18, a patient 1800 may have a tumor 1802. A biopsy may be taken of the tumor 1802 and provided to an imaging system 1804, such as a FIB-SEM imaging system shown in FIG. 18. Of course, other imaging systems, such as MR, CT, US, SEM, and/or light microcopy may be used. In other examples, a biopsy may be acquired from a cadaver, an animal model, or a cell culture. In some examples, multiple tumor biopsies may be acquired from multiple patients and/or sources and provided to the imaging system 1804. Although a solid tumor 1802 is illustrated in FIG. 18, the application is not limited thereto. For example, instead of a tumor 1802, blood and/or bone marrow may be provided to imaging system 1804 (e.g., for detection and treatment of blood cancers or circulating malignant cells from primary tumors).

The imaging system 1804 may generate one or more images 1806, for example, a sequence of images (e.g., sequence 206, sequence 300, sequence 302, sequence 506, and/or sequence 706), of the tumor 1802 or portions thereof (e.g., part of a cell or one or more cells of tumor 1802). Data representing the sequence of images 1806 (e.g., pixel or voxel data) may be provided to a computing system 1808. In some examples, computing system 1808 may be remote from the imaging system 1804. The data may be provided from the imaging system 1804 via a wired or wireless connection in some examples. In some examples, the computing system 1808 may be integrated with the imaging system 1804. The computing system 1808 may include computing system 400 in some examples. The computing system 1808 may analyze the sequence of images 1806 in accordance with a machine learning model 1809. In some examples, the computing system 1808 may include a non-transitory computer readable medium encoded with instructions that when executed by one or more processors of the computing system 1808 implement the machine learning model 1809. The machine learning model 1809 may include machine learning model 202, machine learning model 500, machine learning model 700, and/or machine learning model 1206 in some examples. The computing system 1808 may output data representing one or more denoised images 1810, for example, a sequence of images, corresponding to the sequence of images 1806.

The data representing the sequence of denoised images 1810 may be provided to computing system 1812. In some examples, the sequence of denoised images 1810 may be viewed on a display of the computing system 1812. In some example, the computing system 1812 may be the same as computing system 1808, but may be a different computing system in other examples, and the data representing the denoised images 1810 may be provided to the computing system 1812 via a wired or wireless connection. In some examples, the computing system 1808 and/or computing system 1812 may be integrated with the imaging system 1804. In some examples, the sequence of denoised images 1810 are analyzed by one or more techniques by the computing system 1812. For example, image segmentation algorithms and/or other machine learning models may receive the sequence of denoised images 1810 as inputs. In other examples, the sequence of denoised images 1810 may be analyzed manually, for example, by a researcher 1814.

The sequence of denoised images 1810 may be analyzed for a variety of purposes. In some examples, the sequence of denoised images 1810 may be analyzed to make a diagnosis (e.g., cancerous versus benign, cancer type) and/or determine tumor progression (e.g., stage of development, degree of vascularization, presence of necrosis). In some examples, the sequence of denoised images 1810 may be analyzed to identify one or more targets for therapies (e.g., receptors on surface of tumor cells that drug delivery mechanism may bond to, interactions between tumor cells and/or between tumor cells and normal cells that may be inhibited by therapies, etc.). In some examples, the sequence of denoised images 1810 may be analyzed to determine whether a treatment provided to the patient 1800 is effective and/or provide a prediction of an effective treatment for the patient 1800. In some examples, a treatment recommendation may be made based on the prediction of the efficacy of the treatment. In some examples, the analysis, determinations, and/or predictions based on the sequence of denoised images 1810 may be more accurate than if the original images 1806 has been analyzed. In some examples, the analysis, determinations, and/or predictions based on the sequence of denoised images 1810 may not have been possible with the images 1806.

Based on the analysis of the sequence of denoised images 1810, novel therapies and/or novel therapy delivery systems (e.g., nanoparticles loaded with a known chemotherapy agent and coated with a receptor designed based on the sequence of denoised images 1810) may be designed in some examples. In some examples, one or more known therapies may be identified as potentially effective against tumor 1802. In some examples, the designed and/or identified therapy 1816 may be provided to the patient 1800 to treat the tumor 1802.

The application provided in FIG. 18 is merely exemplary and the embodiments of the present disclosure are not limited to the application provided in FIG. 18.

The foregoing description of certain embodiments is merely exemplary in nature and is in no way intended to limit the scope of the disclosure or its applications or uses. In this detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features are not discussed when they would be apparent to those with skill in the art so as not to obscure the description of embodiments of the disclosure. The discussion herein is therefore not to be taken in a limiting sense, and the scope of the disclosure is defined only by the appended claims. As used herein, the term "apparatus" may refer to a circuit, device, system, component, or combinations thereof. For example, an apparatus may be a computing device, a processor, a memory, a memory device, a mobile device, an edge device, a server, and/or a cloud computing system.

Of course, it is to be appreciated that any one of the examples, embodiments or processes described herein may be combined with one or more other examples, embodiments and/or processes or be separated and/or performed amongst separate devices or device portions in accordance with the present apparatuses, systems, devices and methods.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. An apparatus comprising:
   a logic circuit configured to receive a first input and a second input comprising information related to an image and further configured to provide a first output, a second output, and a noise portion of the image;
   a convolver configured to convolve the first input to generate the first output;
   a synthesizer configured to receive the first output and the second input to generate the second output;
   a noise attention block configured to provide the noise portion based, at least in part, on the second output; and
   an adder configured to combine the noise portion and the image to produce an output image, wherein the output image has less noise than the image.

2. The apparatus of claim 1, wherein the synthesizer comprises:

an update gate configured to determine an amount of the first input and an amount of the second input to include in the second output; and a reset gate configured to determine an amount of the first input and an amount of the second input to exclude from the second output.

3. The apparatus of claim 2, wherein the update gate and the reset gate each comprise:
a first convolution block configured to convolve the first output;
a second convolution block configured to convolve the second input; and
an arithmetic block configured to combine an output of the first convolution block and the second convolution block.

4. The apparatus of claim 3, wherein the update gate further comprises an activation block configured to apply an activation function to an output of the arithmetic block.

5. The apparatus of claim 4, wherein the activation function comprises logic configured to implement a sigmoid function.

6. The apparatus of claim 3, wherein the arithmetic block comprises logic configured to implement a summing function.

7. The apparatus claim 2, wherein the synthesizer further comprises a current cell configured to receive the first input, the second input, an output of the update gate, and an output of the reset gate,
wherein the second output is based, at least in part, on the first output, the output of the update gate, and an output of the current cell.

8. The apparatus of claim 7, wherein the current cell comprises:
a first convolution block configured to convolve the first output;
a second convolution block configured to convolve the second input;
a first arithmetic block configured to combine an output of the first convolution block and the output of the reset gate; and
a second arithmetic block configured to combine an output of the second convolution block and an output of the first arithmetic block.

9. The apparatus of claim 8, wherein the current cell further comprises an activation block configured to apply an activation function to an output of the second arithmetic block.

10. The apparatus of claim 9, wherein the activation function comprises logic configured to implement a hyperbolic tangent function.

11. The apparatus of claim 8, wherein the first arithmetic block comprises logic configured to implement an element-wise multiplication function.

12. The apparatus of claim 8, wherein the second arithmetic block comprises logic configured to implement a summing function.

13. The apparatus of claim 7, wherein the synthesizer further comprises:
a first arithmetic block configured to combine the first output and the output of the update gate;
a unity function block configured to apply a unity function to the output of the update gate;
a second arithmetic block configured to combine the output of the current cell and an output of the unity function block; and a third arithmetic block configured to combine an output of the first arithmetic block and the second arithmetic block to provide the second output.

14. The apparatus of claim 13, wherein the first arithmetic block comprises logic configured to implement an element-wise multiplication function.

15. The apparatus of claim 13, wherein the second arithmetic block comprises logic configured to implement an elementwise multiplication function.

16. The apparatus of claim 13, wherein the third arithmetic block comprises logic configured to implement a summing function.

17. The apparatus of claim 1, wherein the convolver comprises:
a convolution block configured to convolve the first input; and
an activation block configured to activate an output of the convolution block.

18. The apparatus of claim 17, wherein the activation block comprises logic configured to implement a hyperbolic tangent function.

19. The apparatus of claim 1, wherein the noise attention block comprises:
a max pool block configured to max pool a plurality of channels of the second output;
an activation block configured to generate an attention map;
an extraction block configured to extract a first channel from the plurality of channels; and
an arithmetic block configured to elementwise multiply the first channel and the attention map to provide the noise portion.

20. The apparatus of claim 1, further comprising a feedback block configured to combine the second output and an output of the adder block.

21. The apparatus of claim 20, wherein the feedback block comprises:
an activation block configured to apply an activation function to the output of the adder block to generate an activated output; and
a copy block configured to copy over a first channel of the second output with the activated output.

22. A system comprising:
at least one processor; and
at least one non-transitory medium accessible to the processor, the at least one non-transitory medium encoded with instructions that, when executed, cause the system to implement a machine learning model, wherein the machine learning model comprises:
a plurality of building units, wherein individual ones of the building units are configured to receive a first input based on a second image and a second input based at least in part, on the image, and further configured to provide a first output, a second output, and a noise portion; and
a plurality of adders configured to combine the noise portions provided by the plurality of building units to the image to provide output images.

23. The system of claim 22, wherein individual ones of the plurality of building units comprise a noise attention block configured to provide the noise portion based, at least in part, on the second output.

24. The system of claim 22, wherein the machine learning model further comprises a plurality of feedback blocks configured to combine the second outputs provided by the plurality of building units with the output images of corresponding ones of the plurality of adder blocks.

25. The system of claim 24, wherein outputs of at least some of the plurality of feedback blocks comprise the second inputs for at least some of the plurality of building units.

26. The system of claim 22, wherein the second output is based, at least in part, on the first input, the second input, and the first output.

27. The system of claim 22, wherein the first output is based, at least in part, on a convolution of the first input.

28. The system of claim 22, wherein a number of the plurality of building units is based, at least in part, on a magnitude of noise included in the image.

29. The system of claim 22, further comprising:
a second plurality of building units, wherein individual ones of the building units are configured to receive a third input based on a third image and a fourth input based at least in part, on the image, and further configured to provide a third output, a fourth output, and a second noise portion; and
a second plurality of adder blocks configured to combine the second noise portions provided by the second plurality of building units to the image to provide second output images.

30. The system of claim 29, wherein the machine learning model is configured to combine a first output image of a final one of the plurality of adder blocks and a second output image of a final one of the second plurality of adder blocks to provide a final output image.

31. The system of claim 30, wherein the final output image comprises an average of the first output image and the second output image.

32. The system of claim 22, further comprising an ion beam scanning electron microscope configured to acquire the image and the second image.

33. The system of claim 22, wherein the image and the second image are included in a sequence of images.

34. The system of claim 33, wherein the sequence of images comprises a plurality of image planes acquired from a volume.

35. The system of claim 22, wherein individual ones of the building units comprise:
an update gate configured to determine an amount of the first input and an amount of the second input to include in the second output;
a reset gate configured to determine an amount of the first input and an amount of the second input to exclude from the second output; and
a current cell configured to receive the first input, the second input, an output of the update gate, and an output of the reset gate,
wherein the second output is based, at least in part, on the first output, the output of the update gate, and an output of the current cell.

36. The system of claim 22, wherein the instructions when executed, further cause the system to determine when a cancer cell is present in one or more of the output images.

37. The system of claim 22, wherein the instructions when executed, further cause the system to provide at least one of a diagnosis or treatment recommendation based, at least in part, on the output images.

* * * * *